(12) United States Patent
Bercovici et al.

(10) Patent No.: US 11,516,645 B2
(45) Date of Patent: Nov. 29, 2022

(54) CROSS-AGENCY COMMUNICATION THROUGH AN AD-HOC NETWORK SLICE

(71) Applicant: MOTOROLA SOLUTIONS, INC., Chicago, IL (US)

(72) Inventors: Mihael Bercovici, Shoham (IL); David Bar-On, Rehovot (IL); Adi Gil Melamed, Ganei Tikva (IL); Danny Zadok, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 147 days.

(21) Appl. No.: 16/937,914

(22) Filed: Jul. 24, 2020

(65) Prior Publication Data
US 2022/0030407 A1    Jan. 27, 2022

(51) Int. Cl.
*H04W 4/90* (2018.01)
*H04W 28/26* (2009.01)
*H04W 48/18* (2009.01)

(52) U.S. Cl.
CPC .............. *H04W 4/90* (2018.02); *H04W 28/26* (2013.01); *H04W 48/18* (2013.01)

(58) Field of Classification Search
CPC ......... H04W 28/26; H04W 4/10; H04W 4/90; H04W 48/18
See application file for complete search history.

(56) References Cited

U.S. PATENT DOCUMENTS

| | | | |
|---|---|---|---|
| 10,027,801 B1 | 7/2018 | Subramanyam et al. | |
| 2004/0070515 A1* | 4/2004 | Burkley | G01S 5/0072 340/539.2 |
| 2010/0262702 A1* | 10/2010 | Jin | H04L 65/1006 709/227 |
| 2011/0143651 A1 | 6/2011 | Marocchi et al. | |
| 2013/0331139 A1* | 12/2013 | Mills | H04W 4/90 455/509 |
| 2015/0111516 A1* | 4/2015 | Schuette | H04W 4/90 455/404.1 |

(Continued)

FOREIGN PATENT DOCUMENTS

| | | |
|---|---|---|
| EP | 3251383 B1 | 9/2017 |
| EP | 3496447 A1 | 6/2019 |

(Continued)

OTHER PUBLICATIONS

The International Search Report and the Written Opinion, corresponding patent application No. PCT/US2021/039300, filed: Jun. 28, 2021, dated Oct. 6, 2021, all pages.

*Primary Examiner* — Lester G Kincaid
*Assistant Examiner* — Dung L Lam
(74) *Attorney, Agent, or Firm* — Barbara R. Doutre; John B. MacIntyre

(57) ABSTRACT

Devices and systems for providing cross-agency communications at an incident are described. An incident manager determines attributes of devices to be used at the incident, negotiating the devices and device attributes with each first responder agency from which devices are to be dispatched to the incident. The manager controls lifecycles of network slices to provide communication services for the incident. The lifecycle is controlled based on communication from each UE indicating arrival to and departure from the incident, as well as the attributes of the UE.

14 Claims, 10 Drawing Sheets

(56) References Cited

U.S. PATENT DOCUMENTS

2018/0139106 A1* 5/2018 Senarath ............... H04L 41/147
2020/0195495 A1* 6/2020 Parker .................. H04L 9/3239
2020/0314622 A1* 10/2020 Tofighbakhsh ....... H04W 12/06
2021/0407665 A1* 12/2021 Simha ................... A61B 5/747

FOREIGN PATENT DOCUMENTS

| WO | 2012116033 A1 | 8/2012 |
| WO | 2017197273 A1 | 11/2017 |
| WO | 2018102729 A1 | 6/2018 |
| WO | 2019164518 A1 | 8/2019 |

* cited by examiner

US 11,516,645 B2

CROSS-AGENCY COMMUNICATION THROUGH AN AD-HOC NETWORK SLICE

TECHNICAL FIELD

Embodiments pertain to Radio Access Networks (RANs) and core networks (CNs). Some embodiments relate to communications in ad-hoc networks. Some embodiments relate to communications in ad-hoc networks using network slicing in a fifth generation (5G) network.

BACKGROUND

Radio Access Networks (RANs) provide radio communication links for communications through a network between a plurality of user terminals. Such user terminals, if mobile, are known as mobile stations, subscriber devices, or user equipment (UE), which may provide uplink data and control signaling to the RAN and receive data and control signaling from the RAN. A RAN depends on the generation of the network, e.g., evolved NodeBs (eNBs) in a fourth generation (4G) network or fifth generation (5G) NodeBs (gNBs) in a 5G network, may serve the UEs in one or more cells. Network-based communication use has increased due to both an increase in the types of devices using network resources, due to the introduction of a massive number of machine type communication (MTC) UEs, as well as the amount of data and bandwidth used by various applications operated on various UEs, prompting development of the 5G 3GPP protocol.

RANs may operate according to an industry standard protocol such as LTE or 5G, with other protocols running on top of these protocols. These other protocols may include, for example, an open media alliance (OMA) push-to-talk (PTT) over cellular (OMA-PoC) standard or Mission Critical push-to-talk (MCPTT) standard, a voice over IP (VoIP) standard, or a PTT over IP (PoIP) standard. Typically, protocols such as PoC, VoIP, and PoIP are implemented over third generation partnership project (3GPP) Long Term Evolution (LTE) networks. RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI.

The OMA-PoC or MCPTT standard enables PTT as well as "instant on" features of half duplex broadband UEs. One of the situations in which the use of PTT communications is extensive involves first responders at incident scenes. In many cases, first responders from different agencies (e.g., police, fire, EMT, hazmat) converge at an incident scene. While it may be beneficial for the first responders to be able to communicate immediately and seamlessly upon arrival at the incident scene, coordination amongst UEs from the various agencies may be problematic for a number of reasons. In particular, the use of disparate devices from different agencies may degrade the ability of the first responders to effectively communicate due in part to the use different (perhaps incompatible) applications and different phone books, the latter of which may be limited by an agency to include only those subscribers native to that agency. Moreover, cross-agency (or inter-agency) communications may be limited or entirely prevented due to security measures that prevent such communications.

Nor, in some cases, is the network environment used by the first responders capable of providing or otherwise adapting to the desired communication characteristics (e.g., user priority, data rate, and/or latency) for each first responder agency at different incident scenes. This may, in particular, be true if a public network is used and communications of multiple types are desired for the UEs of the first responders. Specific examples of the different services used at different incident scenes include the use of PTT services for cross-agency communication and enhanced Mobile Broadband (eMBB) services for database access at a car accident, while a terrorist/hazmat incident may use, in addition to PTT for cross-agency communication and eMBB services for video streaming, enhanced Machine Type Communication (eMTC) services for communication with various sensors (e.g., vital signs, hazmat) and Ultra-Reliable and Low Latency Communications (URLLC) services for remote medical assistance communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
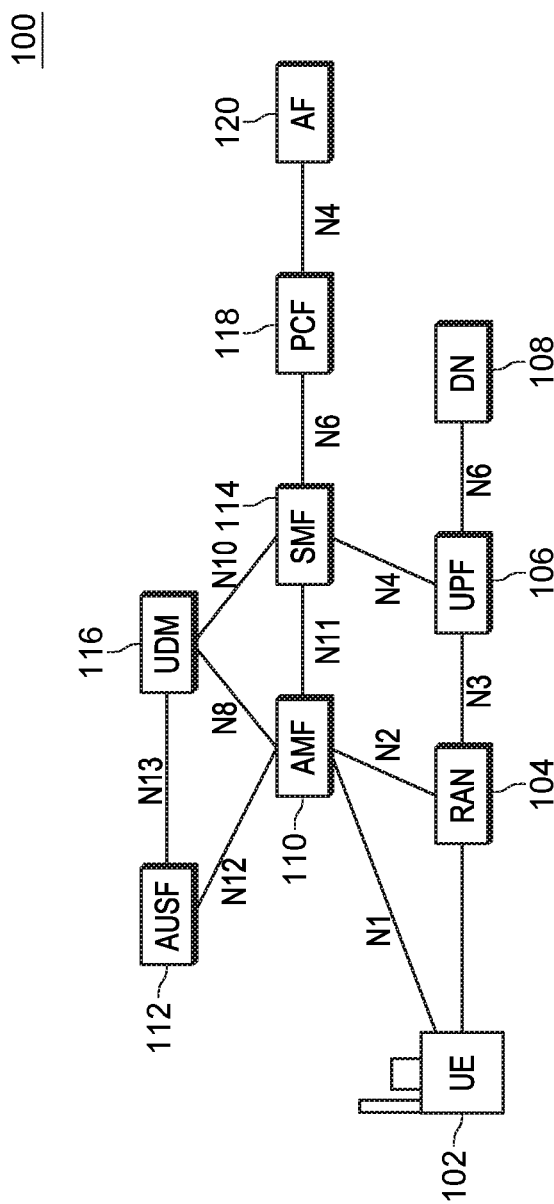
FIG. 1 illustrates a 5G system in accordance with some embodiments.

FIG. 1 illustrates a 5G system 100 in accordance with some embodiments. 5G system 100 may be capable of delivering data using enhanced characteristics compared with 5G systems, such as streaming of up to about 1 Gbps, file download speeds of up to about 20 Gbps, latencies as low as about 1 ms, and device connection densities of about $10^6$ devices/km², for example. 5G system 100 includes multiple 5G network functions (NFs). A network function can be implemented as a discrete network element on a dedicated hardware, as a software instance running on dedicated hardware, or as a virtualized function instantiated on an appropriate platform, e.g., dedicated hardware or a cloud infrastructure. Although not shown, RAN 104 may be connected with an evolved packet core (EPC) (or a RAN connected with the EPC), that includes mobility management entities (MME), serving gateways (S-GWs), and packet data network gateways (P-GWs), among others. RAN 104 may be 5G base stations (referred to as gNodeBs or gNBs) 104. gNB 104 may also include, or be connected to, an eNB or a general non-3GPP access point, such as that for Wi-Fi. gNB 104 may be a standalone gNB or a non-standalone gNB, e.g., operating in Dual Connectivity (DC) mode as a booster controlled by an evolved nodeB (eNB) through an X2 or Xn interface.

In 5G system 100, the control plane (CP) functionalities and the user plane (UP) functionalities are separated. This separation permits independent deployment and adaptation of the 5G system for each operator using the 5G system.

As shown, 5G system 100 includes gNB 104 in communication with UEs 102 as well as a number of elements specific to the architecture of 5G system 100 (5G core network (CN)). These 5G CN elements include a User Plane Function (UPF) 106, an Authentication Server Function (AUSF) 110, an Access and Mobility Management Function (AMF) 112, a Session Management Function (SMF) 114, a Unified Data Management (UDM) 116, a Policy Control Function (PCF) 118, and an Application Function (AF) 120. The UPF 106 may be connected to a Data network (DN) 108, which provides, for example operator services, Internet access, or other 3rd party services. The various elements are connected by the point-to-point reference points (e.g., N1, N2) shown.

UE 102 may generate, encode and encrypt uplink transmissions to, and decode and decrypt downlink transmissions from, gNB 104. A similar functionality may be provided by the entity in communication with UE 102. UPF 106 may be connected with a data network, with which UE 102 may communicate, UE 102 transmitting uplink data to or receiving downlink data from the data network. UPF 106 may, in addition to being the point of connection to DN 108, provide routing and forwarding of packets to UE 102. UPF 106 may also provide QoS handling as well as Deep Packet Inspection (DPI) for packet inspection and classification. UPF 106 may also integrate Firewall and Network Address Translation (NAT) functionality and act as an anchor for Intra RAT and Inter-RAT handovers.

AMF 112 may provide, among other functions, UE-based authentication, authorization, mobility management, security context, connection and registration management, and non-access stratum (NAS) signaling termination. SMF 114 may be responsible for, among others, session management (including establishment, modification, and termination of a session, and NAS signaling termination of the session), providing Dynamic Host Configuration Protocol (DHCP) functionality, allocation and management of IP addresses to UE 102, and providing notification of downlink data to UE 102. SMF 114 may also select and control UPF 106 for data transfer, including providing the traffic steering configuration. SMF 114 may thus act as the interface for all user plane communication and may determine how the policy and charging for these services is applied. SMF 114 may be associated with a single session of UE 102 or multiple 5G sessions of UE 102. Note that while UE 102 may have multiple sessions, each session may be allocated to a different SMF 114, thereby allowing each session to be individually managed. As a consequence, the functionalities of each session may be independent of each other.

AF 120 may provide information on the packet flow to the PCF 118 responsible for policy control to support a desired QoS. AF 120 may also provide access to the network exposure function (NEF) (not shown), which permits exposure of the services and capabilities provided by the network functions in a secure manner to an external (non-3GPP) application. The NEF provisions the control plane parameters and manages packet flow descriptors (protocol, server-side IP and port number). Similarly, the network repository function (NRF) (not shown) in the network maintains the network profile of UE 102 and available network function instances, as well as supporting the service discovery function, thereby permitting the network functions to discover each other. Also, a Network Slice Selection Function (NSSF) in the network may select the Network Slice instances to serve UE 102, determine allowed Network Slice Selection Assistance Information (NSSAI) and determine the appropriate AMF 110 to serve UE 102. The NSSF may thus redirect traffic in the network to the appropriate network slice, which may be defined for different classes of subscribers.

AUSF 110 may store data for UE authentication, including keys, acting as an authentication server for UE 102. UDM 116 may similarly store the UE subscription data (including generation of Authentication and Key Agreement (AKA) credentials for UE 102), supporting access authorization of UE 102 as well as subscription management for UE 102.

PCF 118 may provide policy rules for the control plane functions for UE 102, including mobility and session management policies. To this end, PCF 118 may use the packet flow information to determine the appropriate control plane policies for proper operation of AMF 112 and SMF 114. PCF 118 may access subscription information for policy decisions and support the 5G QoS policy and charging control functions. PCF 118 thus takes care of network policies to manage network behavior. PCF 118 obtains the subscription information from UDM 116 and interfaces to SMF 114 to manage the session contexts and to AMF 110 to manage the mobility context. PCF 118 triggers the UE route selection policy (URSP) which enables the UE to determine how a particular application should be handled in the context of an existing or new PDU (Packet Data Unit) session. The URSP may provide the UE with information about a new network slice configuration; the slice ID of the network slice may thus be communicated from PCF 118.

Note that various specialized servers are not show in FIG. 1 for convenience. For example, in some embodiments a PTT server may be present to provide floor control in an OMA-PoC or MCPTT session. When a PTT (hard or soft) button on a UE that has subscribed to the OMA-PoC or MCPTT session is actuated, the UE may transmit a request for permission in the OMA-PoC or MCPTT session to the PTT server using, for example, a real-time transport protocol (RTP) message. If the PoC session is not occupied, there are no other UEs transmitting when the PTT button is actuated, the PTT server may transmit an acceptance message to the UE, which can then begin transmitting encoded audio and/or video data (which may be compressed) to the PTT server over the RTP or IP protocol. The PTT server may then send the audio and/or video data to one or more other UEs that have subscribed to the PoC session using unicast, multicast, or broadcast communications.

In some embodiments, UEs may be partitioned into separate work groups. In some land mobile radio (LMR) cases, each group may be assigned a particular frequency (channel) for communication between the UEs in the group. The channel used by each group may be unique or may be shared with another group. In the latter case, a group ID may be used during transmission to enable distinguishing between groups for transmissions.

In other trunked LMR systems, a pool of frequencies may be shared among all groups, allowing more flexibility in resource usage for the pool among the groups as some groups with more communications are able to expand channel usage while other groups with fewer communications are able to use the channels less often. That is, when a group member activates the PTT button, a call request that is associated with the group ID may be transmitted to the PTT server on a control channel. The control channel may be a particular frequency that remains idle until a call request is transmitted. Each UE may monitor the control channel for a new call notification. The PTT server may receive the call request and in response assign a specific channel for the requested group call and send the assignment to UEs associated with the group ID. This may permit the group UEs to move from the control channel to the assigned channel.

Figure 2:
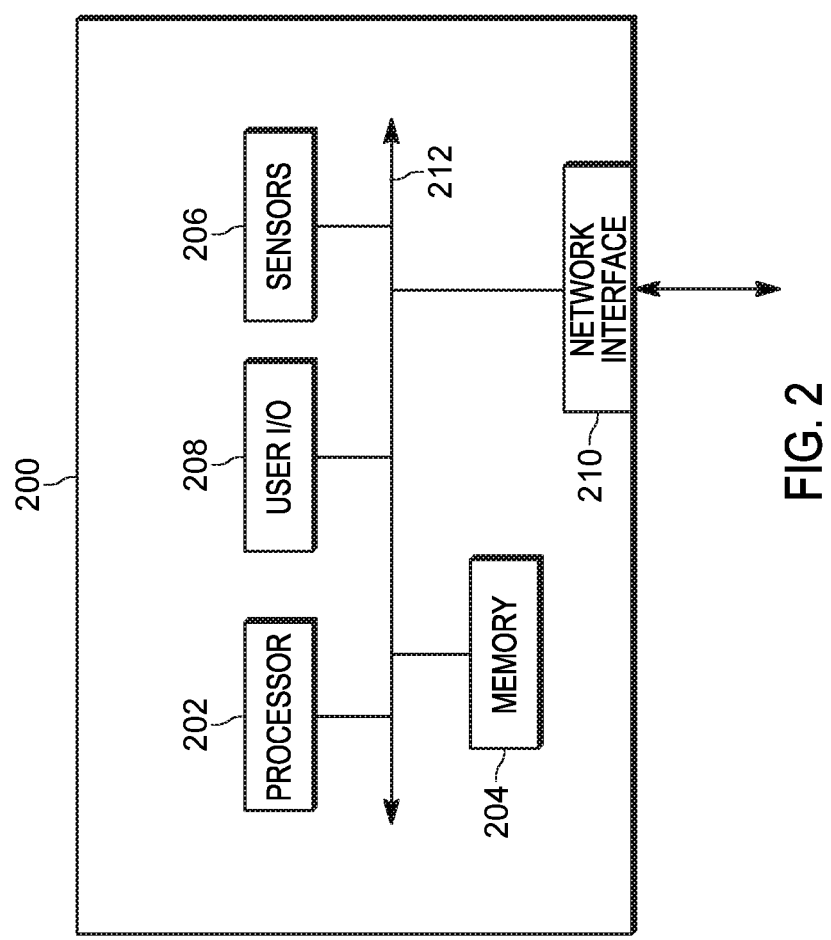
FIG. 2 illustrates a block diagram of a communication device in accordance with some embodiments.

FIG. 2 illustrates a block diagram of a communication device 200 in accordance with some embodiments. In some embodiments, communication device 200 may be a personal device, such as a UE, or a network device, such as one or more of those described in relation to FIG. 1 (e.g., a gNB, an eNB, or other equipment used in the network environment). Communication device 200 may include a physical device and/or a virtual device, such as a server running one or more virtual network functions (VNFs) of the network shown in FIG. 1. In various examples, communication device 200 may be a specialized computer, a personal or laptop computer (PC), a tablet PC, a mobile telephone, a smartphone, a network router, switch or bridge, or any machine capable of executing instructions (sequential or otherwise) that specify actions to be taken by that machine. In some embodiments, communication device 200 may be an internet-of-things (IoT) or a narrowband IoT (NB-IoT) device or other device embedded within other, non-communication-based devices such as appliances or vehicles.

Communication device 200 may include various components connected by a bus 212. Communication device 200 may include a hardware processor 202 such as one or more central processing units (CPUs) or other processing circuitry able to provide any of the functionality described herein when running instructions. Processor 202 may be connected to a memory 204 may include a non-transitory machine-readable medium on which is stored one or more sets of instructions. Memory 204 may include one or more of static or dynamic storage, or removable or non-removable storage, for example. A machine-readable medium may include any medium that is capable of storing, encoding, or carrying instructions for execution by processor 202, such as solid-state memories, magnetic media, and optical media. Machine-readable medium may include, for example, Electrically Programmable Read-Only Memory (EPROM), Random Access Memory (RAM), or flash memory.

The instructions may enable communication device 200 to operate in any manner thus programmed, such as the functionality described specifically herein, when processor 202 executes the instructions. The machine-readable medium may be stored as a single medium or in multiple media, in a centralized or distributed manner. In some embodiments, instructions may further be transmitted or received over a communications network via a network interface 210 utilizing any one of a number of transfer protocols (e.g., frame relay, internet protocol (IP), transmission control protocol (TCP), user datagram protocol (UDP), hypertext transfer protocol (HTTP), etc.).

Network interface 210 may thus enable communication device 200 to communicate data and control information with other devices via wired or wireless communication. Network interface 210 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which communication device 200 may be connected via network interface 210 may include a local area network (LAN), a wide area network (WAN), a packet data network (e.g., the Internet), mobile telephone networks (e.g., cellular networks), and wireless data networks. Communication device 200 may be connected to the networks via one or more wired connectors, such as a universal serial bus (USB), and/or one or more wireless connections, and physical jacks (e.g., Ethernet, coaxial, or phone jacks) or antennas.

Communication device 200 may further include one or more sensors 206, such as one or more of an accelerometer, a gyroscope, a global positioning system (GPS) sensor, a thermometer, a magnetometer, a barometer, a pedometer, a proximity sensor, and an ambient light sensor, among others. Sensors 206 may include some, all, or none of one or more of the types of sensors above (although other types of sensors may also be present), as well as one or more sensors of each type.

Sensors 206 may be used in conjunction with one or more user input/output (I/O) devices 208. User I/O devices 208 may include one or more of a display, a camera, a speaker, a keyboard, a microphone, a mouse (or other navigation device), or a fingerprint scanner, among others. User I/O devices 208 may include some, all, or none of one or more of the types of I/O devices above (although other types of I/O devices may also be present), as well as one or more I/O devices of each type.

Communication device 200 may include different specific elements depending on the particular device. For example, although not shown, in some embodiments communication device 200 may include a front end that incorporates a millimeter and sub-millimeter wave radio front end module integrated circuit (RFIC) connected to the same or different antennae. The RFICs may include processing circuitry that implements processing of signals for the desired protocol (e.g., medium access control (MAC), radio link control (RLC), packet data convergence protocol (PDCP), radio resource control (RRC) and non-access stratum (NAS) functionality) using one or more processing cores to execute instructions and one or more memory structures to store program and data information. The RFICs may further include digital baseband circuitry, which may implement physical layer functionality (such as hybrid automatic repeat request (HARM) functionality and encoding/decoding, among others), transmit and receive circuitry (which may contain digital-to-analog and analog-to-digital converters, up/down frequency conversion circuitry, filters, and amplifiers, among others), and RF circuitry with one or more parallel RF chains for transmit/receive functionality (which may contain filters, amplifiers, phase shifters, up/down frequency conversion circuitry, and power combining and dividing circuitry, among others), as well as control circuitry to control the other RFIC circuitry.

As indicated above, one or more of the network devices shown in FIG. 1 may be implemented, not by physical implementations, but by VNFs. VNFs have taken on increasing significance due to the increasing complexity of the 5G network. In particular, it may be costly or difficult, at best, to update or replace physical network devices when the functionality of the network devices (such as the mobility management entity (MME) and serving and packet data gateways in LTE and 5G architectures and the AMF and SMF in 5G architectures) is to be altered. Software may thus be used to permit general purpose computers in a centralized or distributed manner to provide one or more network functions as one or more VNFs of a Network Function Virtualization (NFV) architecture. The NFV architecture may support multiple independent networks (slices) that may each contain all of the functionality available in the NFV architecture.

Figure 3A:
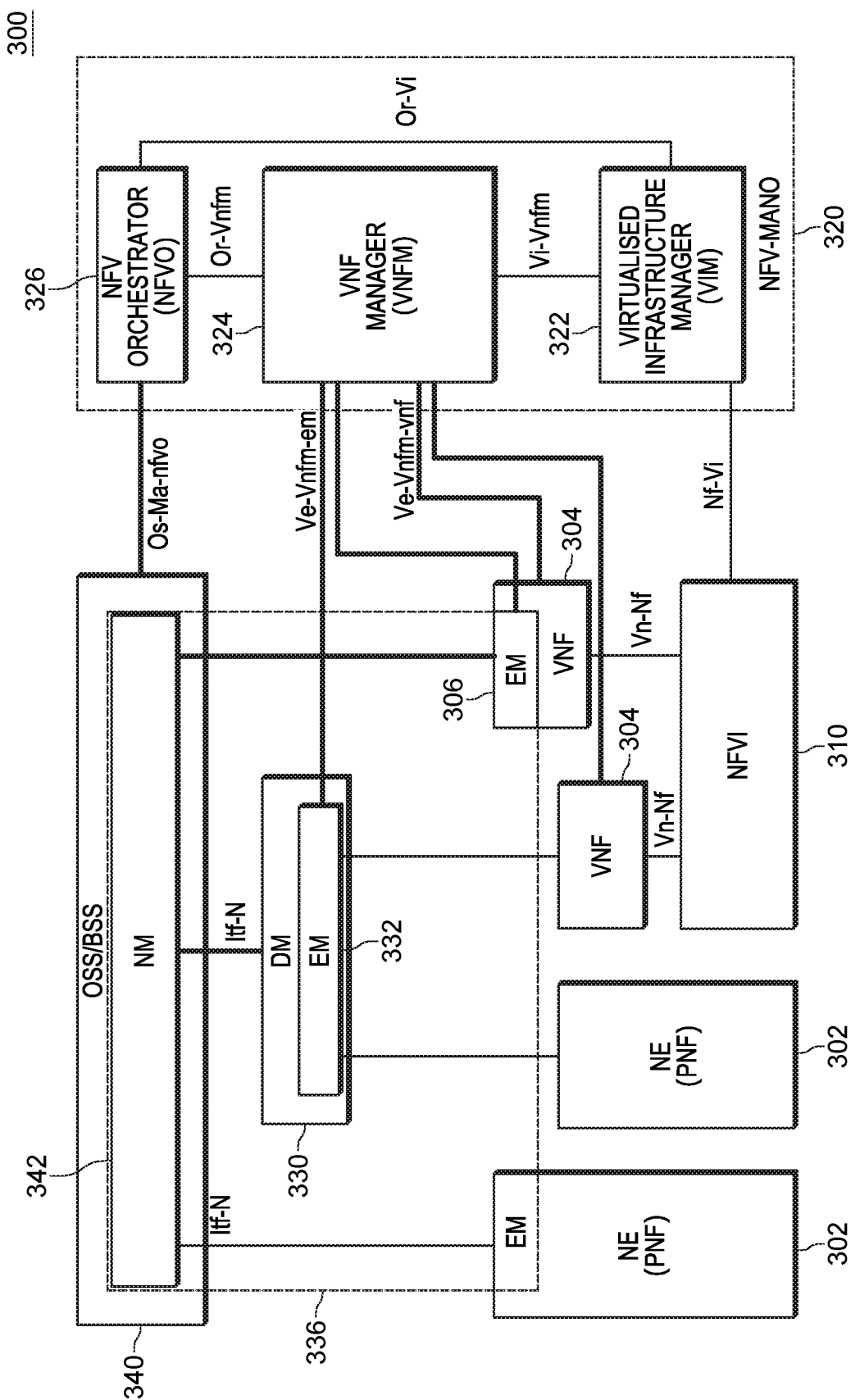
FIG. 3A illustrates a network function virtualization (NFV) network management architecture in accordance with some embodiments.

FIG. 3A illustrates an NFV architecture 300 in accordance with some embodiments. NFV architecture 300 functions to both implement slices and manage and orchestrate the slices so implemented over the life cycle of each slice. The life cycle of each slice may include commissioning (creation/instantiation) of the slice, operation or maintenance of the slice (including activation, supervision, reporting, modification, and de-activation), and decommissioning (termination) of the slice.

NFV architecture 300 may include physical components that implement virtualized components with different functionality. NFV architecture 300 may be implemented by, for example, a data center comprising one or more servers in the cloud. NFV architecture 300 may include one or more physical devices and multiple applications hosted on one or more platforms. These platforms may include, among others, a localized platform, such as a server, or a distributed platform, such as a cloud computing platform or other distributed computing platform. NFV architecture 300 as illustrated may include Network Elements (NEs) 302, Virtual Network Functions (VNFs) 304, a Network Virtualization Function Infrastructure (NVFI) 306, a Network Functions Virtualization Orchestrater (NFV-MANO) 320, a Domain Manager (DM) 330, and an Operations Support System/Business Support System (OSS/BSS) 340.

NEs 302 may provide physical components (physical network functions—PNFs), such as dedicated hardware (e.g., processors, antennas, amplifiers, isolators, clock circuitry, transmit and receive chains, among others), as well as software. NFV architecture 300 may include multiple Network Functions (NFs), which each provides a specific functional behavior and has well-defined external interfaces.

VNFs 304 may be an implementation (both components and connectivity when instantiated) of at least one NF instantiated in or deployed on (runs on) NFVI 310. The VNF thus provides functionality of the NF(s), elements supporting the NF functionalities (e.g., library, database, protocol stacks), and elements enabling VNF 304 to run on NFVI 310. The NF functionality and NF elements supporting the NF functionality in each VNF 304 may be managed by an element manager (EM) 306 in that VNF 304. Each VNF 304 may provide a network function that is decoupled from at least some of the infrastructure resources (computational resources, networking resources, memory) used to provide the NF. VNFs 304 can be chained together to realize a desired network service. The virtualized resources may provide VNFs 304 with desired network resources.

VNFs 304, like NEs 302, may be managed by one or more EMs 306. EM 306 may provide functions for management of virtual or physical network elements, depending on the instantiation. EM 306 may manage individual NEs 302 and NEs 302 of a sub-network, which may include relations between NEs 302. For example, EM 306 of a VNF 304 may be responsible for configuration for the NFs provided by VNF 304, fault management for the network functions provided by VNF 304, accounting for the usage of VNF functions of VNF 304, and collecting performance measurement results for the functions provided by VNF 304.

NFVI 310 includes all hardware and software in the environment in which VNFs 310 are deployed. NFVI 310 contains a NFVI node that has one or more physical devices deployed and managed as a single entity to provide the NFVI functions to support the VNF environment. NFVI 310 may control VNFs 304 via Vn-Nf reference points. Although not shown, NVFI 310 may contain both virtualized and non-virtualized resources that provide computational abilities, storage (either block or file-system level) and networking elements that may include networks, subnets, ports, addresses, links and forwarding rules to ensure intra- and inter-VNF connectivity.

NFV-MANO 320 may include a Virtualized Infrastructure Manager (VIM) 322, a VNF Manager (VNFM) 324, and a Network Function Virtualization Orchestrator (NFVO) 326. NFV-MANO 320 may manage NFVI 310. NFV-MANO 320 may create or terminate a VNF 320, increase or decrease VNF capacity, or update or upgrade software and/or configuration of a VNF 304. NFV-MANO 320 may have access to various data repositories including network services, VNFs available, NFV instances and NFVI resources with which to determine resource allocation.

NFV-MANO 320 may thus orchestrate the instantiation of network services, and the allocation of resources used by VNFs 304. NFV-MANO 320 may, along with OSS/BSS 340, be used by external entities to deliver various NFV business benefits. OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling.

VIM 322 is responsible for controlling and managing the NFVI resources, including the compute, storage and network resources. VIM 322 may be specialized in handling a particular type of NFVI resource (e.g., compute-only, storage-only, networking-only), or may be capable of managing multiple types of NFVI resources. VIM 322 may orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g., hypervisors), and discovery of the capabilities and features (e.g., related to usage optimization) of such resources. To this end, VIM 322 may control and manage the NFVI resources via Nf-Vi reference points. VIM 322 may further collect and forward performance measurements and events to VNFM 324 via Vi-VNFM reference point and to NFVO 326 via the Or-Vi reference point.

VNFM 324 is responsible for the lifecycle management of VNFs 324 through a Ve-Vnfm-vnf reference point. VNFM 324 may orchestrate NFVI resources via VIM 322 and provide overall coordination and adaptation for configuration and event reporting between VIM 322 and EMs 306 and Network Managers (NMs) 342 via a Ve-Vnfm-em reference point. VNFM 350 may be assigned the management of a single VNF 320, or the management of multiple VNFs 320 of the same type or of different types. To this end, VNFM 324 may discover available services, manage virtualized resource availability/allocation/release and provide virtualized resource fault/performance management, in addition to providing service lifecycle management that may include instantiating a VNF, modifying the VNF instances, and terminating the network service, as well as releasing the NFVI resources for the service to the NFVI resource pool to be used by other services.

NFVO 326 manages the Network Service (NS) lifecycle and coordinates the management of the NS lifecycle, the VNF lifecycle (supported by the VNFM) and the NFVI resources (supported by VIM 322) to ensure an optimized allocation of the necessary resources and connectivity. NFVO 326 may coordinate VNFs 304 as part of network services that jointly realize a more complex function, including joint instantiation and configuration, configuring connections between different VNFs 304 and managing dynamic changes of the configuration. NFVO 326 may provide this orchestration through an OS-Ma-NFVO reference point with NM 342 of the OSS/BSS 340, which may also include a domain manager (DM) 330 that itself contains an EM 332.

EMs 306, 322 (whether in a VNF 306 or NE 302) may be managed by NM 342 of OSS/BSS 340 through Itf-N reference points. NM 342 may provide functions with the responsibility for the management of a network, mainly as supported by EM 332 but may also involve direct access to the network elements. NM 342 may connect and disconnect VNF external interfaces to physical network function interfaces at the request of NFVO 326.

As above, with the advent of 5G networks and disparate types of devices (such as Machine Type Communication (MTC), enhanced Mobile Broadband (eMBB) and Ultra-Reliable and Low Latency Communications (URLLC) devices) using these networks, network management and network slicing is evolving towards a service-based architecture in which virtualization is used. To provide network management and slicing, network provisioning and resource management, fault supervision, performance management (PM) and reporting, and management data analytics may be enabled.

Network slicing is virtualization that uses the architecture shown in FIG. 3A to provide multiple configurable logical and independent networks as independent network slice instances (NSIs) to different consumers, such as eMBB, healthcare, automotive, safety or mission critical, and IoT users. Each NSI may provide a desired network service, which is isolated from the network resources of other NSIs and may thus allow an optimized topology and specific configuration to be developed for each NSI based on the desired network services. Examples of various network services may include big data, edge computing, cloud storage, and platform security, among others. The configuration may enable various aspects of network capability to be tailored for the NSI. These aspects may include guaranteed Quality of Service (QoS), throughput, latency, reachability, data security, mobility, and massive connectivity, among others.

For example, an eMBB NSI may be designed to contend with large data volumes and increased data capacity and user density, a massive MTC NSI may be designed to support large numbers of connected devices with low data rates, and a URLLC NSI may be designed to cater for mission-critical situations and devices. In particular, an NSI designed for a massive number of IoT devices, which may have unique charging and control functionality that are dependent on the industry requesting the NSI—in one instance, real-time vehicle traffic information, which may collect a large number of disparate pieces of information from MTC terminals in vehicles and infrastructure for analysis and dissemination to users (e.g., map updates and route determination). Vehicles themselves may use a different NSI to enable URLLC for autonomous driving, vehicle-to-vehicle (V2V) communication, and data gathering and analysis from telemetry sensors, while also providing high throughput for entertainment functionality.

Each NSI may contain one or more Network Slice Subnet Instance (NSSIs) that are each associated with different portions of the core network (CN) or access network. An NSSI represents a group of NFs and may be associated with one or more NSIs. This permits the lifecycle of the NSSI to be managed independently from the lifecycle of an NSI. The NSSIs may be implemented as different core networks, such RAN and 5GC.

Figure 3B:
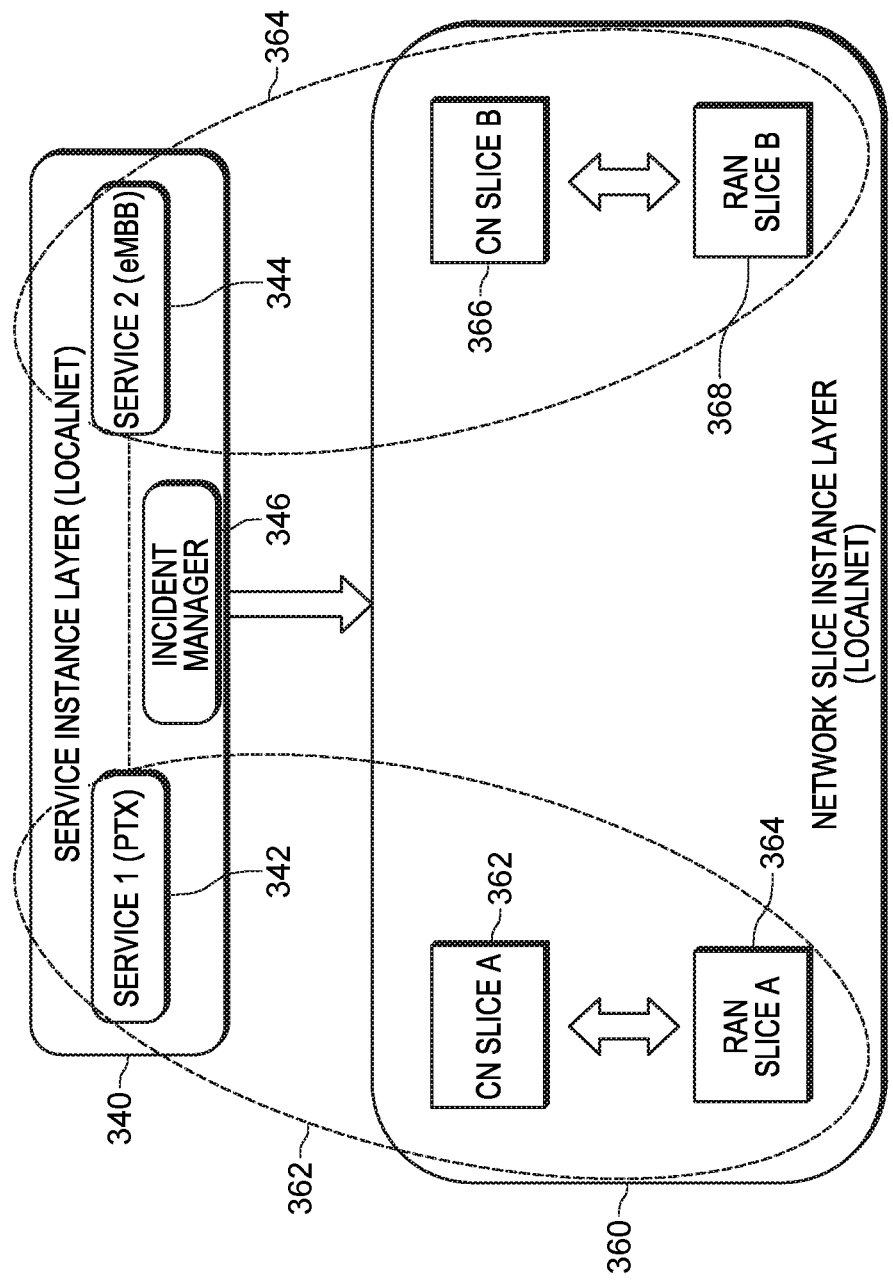
FIG. 3B illustrates network slice creation in accordance with some embodiments.

Accordingly, FIG. 3B illustrates network slice creation in accordance with some embodiments. As shown, multiple communication service instances may be instantiated by an incident manager 356 in a service instance layer 350 of the local network (LocalNet). Service instance layer 350 may communicate with the MNVO of a network business entity that shares the physical network to provide the service requirements. Service instance layer 350 may direct an NSI layer 360 of the LocalNet to create one or more NSIs for the desired communication services based on the service requirements. The communication services may include, for example, a push-to-anything (PTX) service 352 and an eMBB service 354, although other services (such as URLLC, IoT service, intercommunication via a common application, subscription to sensor data, and access to group contact list/phonebook) may also be provided by one or more of the NSIs. PTX service 352 may be provided by NSI layer 360 in a PTX NSI 362, while eMBB service 354 may be provided in an eMBB NSI 364. The different parts of an NSI are grouped as Network Slice Subnets (e.g., RAN, 5GC and Transport) allowing the lifecycle of a Network Slice Subnet Instance (NSSI) to be managed independently from the lifecycle of an NSI. The underlying physical architecture for each of PTX NSI 362 and eMBB NSI 364 includes a core network (CN) slice 362, 366 that provides CN services (e.g., AMF, SMF) and a RAN slice 364, 368 that provides that provides access to the network.

Note that while a specific embodiment is shown in which the entirety of both the RAN and CN are incorporated in a network slice, in FIG. 3B, other network slicing embodiments may be used. In particular, elements of the RAN (such as the central and distributed units in a gNB) and CN may be partitioned into network slices. A network slice may thus incorporate elements of the RAN and/or elements of the CN.

The use of virtualization and network slicing in 5G networks may be used to provide interconnectability among first responders from different agencies (i.e., cross-agency communications) as well as deliver desired services at an incident scene that are particularized to the incident scene. In particular, as described in more detail below, reporting of an incident may trigger creation of one or more NSIs each used to deliver a different service (e.g., PTT, IoT, mMTC communications) to UEs at the incident scene using common control plane network functions to enable UE mobility for UEs connected to more than one NSI. UEs at the incident scene, whether mobile or stationary, may establish a PDU session (the UE may be simultaneously connected with up to 8 network slices, that each UE may have other PDU sessions with different Data Network Names (DNNs) through different network slices) or attach to one or more of the appropriate NSIs until the incident is over, at which point the NSIs are cancelled and the UEs may be reconfigured to the state prior to the incident. While the incident is in progress, the UEs at the incident scene may use a common application having a common phonebook shared by all UEs running the application and enabling PTT communication amongst all of these UEs. The phonebook may contain connectivity information (such as unique IDs) for the UEs that allows the UEs to communicate via PTT via an OMA-PoC or MCPTT session. Some UEs may be connected to a single NSI, while other UEs may be connected to multiple NSIs, dependent on the purpose and capabilities of the UE. The UEs that are connected to multiple NSIs may be connected to different sets of the NSIs.

As shown in FIG. 3A, NSIs 362, 364 of FIG. 3B may be created and controlled through NFV-MANO 320 (through interaction with the incident manager, as described in more detail below). To enable creation and control of various NSIs in general, the allocation and configuration of the resources to provide the desired services may be determined, as may the logic, types and interconnection of NFs allocated to provide each desired service. Control of the lifecycle (instantiation, modification, and cancellation) of the NFs and NSIs may be dynamic and thus based on changing parameters of the service, controlled by the capabilities and resources to be used by the UEs to establish a PDU session/ attach to each NSI and use particular NF(s) associated with the NSI. To implement these features, multiple logical devices may be implemented, including an incident manager, a network slice controller, and a slice QoS controller. In general, the incident manager may gather relevant information of the incident and manage both the UEs and creation of the NSI. The network slice controller may dynamically allocate network functions within each NSI. The slice QoS controller may control QoS service of communication flow within each NSI.

Figure 4:
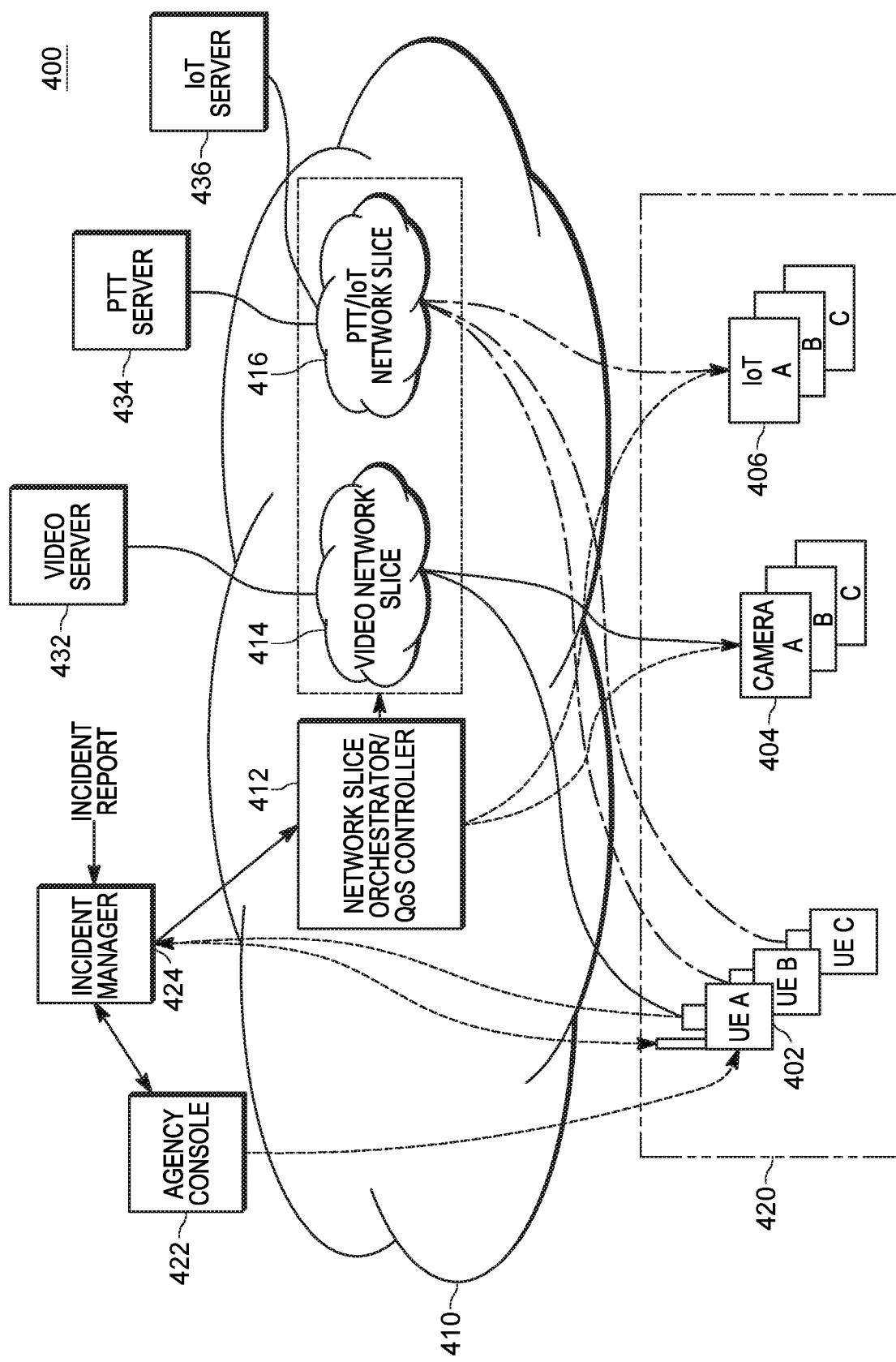
FIG. 4 illustrates a system according to some embodiments.

FIG. 4 illustrates a system according to some embodiments. As shown, multiple types of UEs may be present in incident scene 420. FIG. 4 shows only some aspects of overall system 400, other features and elements may be present but are not illustrated for brevity. UEs 402, 404, 406 may include mobile UEs 402, as well as fixed UEs such as (traffic or other mounted) cameras 404 and IoT UEs 406 that are permanently (or semi-permanently) affixed at incident scene 420, although other types of UEs may also be present. UEs 402, 404, 406 may be connected through a 5G network 410 to one or more network function servers 432, 434, 436. In some cases, at least some of mobile UEs 402 may also be in communication with an appropriate agency console 422 and/or incident manager 424. In various embodiments, agency console 422, incident manager 424, and network function servers 432, 434, 436 may include some elements shown in communication device 200 of FIG. 2, including processor, memory, and network interface. Agency console 422 and incident manager 424 may, in addition, contain user I/O devices, including one or more of at least one of a monitor/touchscreen display, speaker, LED outputs, user input device (e.g., keyboard, mouse), switches, and buttons, among others.

5G network 410, in addition to including the RAN and core network functionality described in FIG. 1, may also include a network QoS server 412, as well as network slices (NSIs) 414, 416. The network slices may include, for example, a video network slice 414 created for communications between a video server 432 and one or more of the mobile UEs 402, one or more of cameras 404 and/or one or more of IoT UEs 406. Similarly, the network slices may include a PTT/IoT network slice 416 created for communications between UEs 402, 404, 406 (one or more of mobile UEs 402, one or more of cameras 404 and/or one or more of IoT UEs 406) and both a PTT server 434 and an IoT server 436.

System 400 may also include an incident manager 424 and one or more agency consoles 422. Incident manager 424 may be a human operator and/or an automated system such as a 911 system that is able to receive an electronic communication (e.g., phone call, email, SMS message) and react accordingly. Each agency console 422, like incident manager 424, may be a human operator and/or an automated system. Agency console 422 may be capable of communicating with incident manager 424. Incident manager 424 may cover a specific geographical area in which the incident scene is located.

In some embodiments, after an incident is reported to incident manager 424, incident manager 424 may determine the type of incident and resources required for the incident based on the information reported. The information reported may include parameters such as the incident type and specifics about the incident (e.g., vehicle accident, number of vehicles involved, geographic location of the incident).

Incident manager 424 may select an alphanumeric incident code (or incident identifier) for transmission to each agency console 422. Some embodiments, the incident code may merely identify a particular incident to be later used by at least mobile UEs 402 to join the incident when mobile UEs 402 arrive at the incident location. The incident code may, in some embodiments, be selected randomly, perhaps from a limited set of available incident codes. In such embodiments, the incident code may be provided to each agency console 422 selected by incident manager 424 along with the geographic location, the incident type and resources for the agency, among others. In other embodiments, rather than selecting the incident code randomly, predetermined sections of the incident codes may be used to identify one or more of the parameters or a combination of the parameters. In one such embodiment, different prefixes and/or suffixes of the alphanumeric code may be used to identify each of the parameters. In one embodiment of generating such a code, a first set of digits may identify the incident type, the second set of digits may identify the location of the incident (e.g., GPS coordinates), the third set of digits may identify the resources requested, the fifth set of digits may identify the number of resources requested for a first of the resources, etc.

Agency console 422 may, in response to the request from incident manager 424, provide the available amount of resources and capabilities to incident manager 424. That is, agency console 422 may send the UE functionality and communication performance to be used that fit the incident type and the incident code to incident manager 424. Agency console 422 may also send to incident manager 424 user roles (and/or ranking) and responsibilities of the UEs to be dispatched to the incident scene. In some embodiments, each agency console 422 may act like a central clearing house for associated agencies; that is, agency console 422 may be responsible for selecting agency entities to respond to the incident based on the information received from incident manager 424. In embodiments in which agency consoles 422 are individualized by geographic location, each agency console 422 selected by incident manager 424 to receive the information may be limited by the geographic location of the incident. In this latter embodiment, for example, if a fire department is to be included in the incident response, incident manager 424 may initially communicate the information to only agency console 422 associated with the fire department that normally covers the geographic location.

When agency consoles 422 are individualized by geographic location, there may further be negotiation between agency console 422 and incident manager 424 for the requested resources if the agency associated with agency console 422 is unable to supply at least some of the requested resources. In particular, the requested resources may be initially requested from agency console 422 by incident manager 424, and agency console 422 may indicate to incident manager 424 that the resource capabilities of the associated agency are insufficient to fulfill the requested resources. For example, agency console 422 may determine either the identified incident is of a type that is normally too large for the associated agency, or at least some of the requested resources that are normally available are unavailable when requested as these resources are responding to another incident. In this case, agency console 422 may also provide the available amount of resources and capabilities to incident manager 424. Agency console 422 may in some embodiments provide to incident manager 424 one or more alternate agencies (or agency consoles 422) with whom incident manager 424 should attempt to procure the additional resources requested. In other embodiments, agency console 422 may not provide this information to incident manager 424; incident manager 424 may instead determine the information before requesting the missing resources from other agency console(s) 422 (engaging in much the same communications as with initial agency console(s) 422).

In some embodiments, the requested resources for each type of incident may be invariant. Thus, for example, the resources requested by incident manager 424 for each 2 alarm fire may be the same, independent of the location of the fire. The resources for a 2 alarm fire may, however, be the same as or different from that for a 3 alarm fire. Incident manager 424 may maintain a list of basic resources for each type of incident, which may be able to be modified by incident manager 424 based on the received incident report. In other embodiments, the resources requested by incident manager 424 for a particular incident type may vary based on, for example, fixed UEs 404, 406 that are present at the location. Thus, for example, if video resources are to be used, whether or not incident manager 424 requests from agency console 422 resources including those capable of providing video resources (as well as perhaps an amount of such resources) may depend on whether fixed UEs 404, 406 can provide similar functionality.

Once incident manager 424 has negotiated resources among agency console(s) 422, mobile UEs 402 may be dispatched by agency console 422 to incident scene 420. Agency console 422 may provide the incident code indicated prior to, or in embodiments after, mobile UEs 402 arriving at incident scene 420. Agency console 422 may also send user roles/ranking and responsibilities to the dispatched UEs provisioned with the incident code. Mobile UEs 402 after arriving at incident scene 420 may indicate the arrival (and capacities of mobile UEs 402 that have arrived) to incident manager 424 via electronic communication. For example, mobile UEs 402 may call a predetermined telephone number to indicate arrival and join a session established specifically for the incident. UEs 402, 404, 406 may download and activate an already-downloaded common application to communicate with other UEs 402, 404, 406 at incident scene 420. The common application may have a common phonebook to permit UEs 402, 404, 406 at incident scene 420 to communicate.

Incident manager 424 may translate the information from agency console(s) 422 into network slice(s) characteristics to enable optimal intercommunication and collaboration between all UEs at the incident scene. Incident manager 424 may translate the service models and use cases into one or more network slices. Incident manager 424 may then communicate with a network slice orchestrator 412 that centralizes QoS control of the various communication services via slicing. In particular, incident manager 424 may request that a network slice orchestrator 412 that creates one or more network slices for the incident identified in the incident report. As illustrated in FIG. 4, these network slices may include a video network slice 414 and a PTT and/or IoT network slice 416, although additional network slices may be created by network slice orchestrator 412. Network slice orchestrator 412 may also centralize QoS control of the various communication services via slicing; network slice orchestrator 412 may thus obviate communication with the PCF to support a desired QoS for each slice, instead itself managing policy rules between applications and policy enforcement points, adding and re-configuring various policies to dynamically manage and control the QoS (in addition to charging, quota, optimization, and admission control).

In embodiments in which network slicing is used, each mobile UE 402 at incident scene 420 may, in response to transmission to incident manager 424, receive a slice ID that is unique for each slice (e.g., video, PTT/IoT as shown) that mobile UE 402 is to use. Each slice may use an operational frequency (channel) that is agreed upon by the agencies and/or based on the UE capabilities sent by the agency console(s). After creation of network slices 414, 416, network slice orchestrator 412 may provide the slice ID of each slice to incident manager 424 for incident manager 424 to provide to mobile UEs 402 after arrival of mobile UEs 402 at incident scene 420. In addition, network slice orchestrator 412 may obtain address information of fixed UEs 404, 406 from incident manager 424 and invite fixed UEs 404, 406 to use network slices 414, 416 as appropriate. Once UEs 402, 404, 406 are connected with 5G network 510 and network function servers 432, 434, 436 using network slices 414, 416, and have joined the PTT service, UEs 402, 404, 406 may communicate via the common application. In some embodiments, an incident captain UE control the incident session used by UEs 402, 404, 406; that is, the incident captain UE may initiate the incident session prior to communication being enabled between UEs 402, 404, 406, and may terminate the incident session after the incident is over.

In embodiments in which network slicing is not used, UEs 402, 404, 406 at incident scene 420 may be connected with associated network function servers 432, 434, 436 via 5G network 410 without using network servers 412, 414, 416. Thus, instead of using network slice orchestrator 412, each network function server 432, 434, 436 may be responsible to set the QoS for its services. In this case, incident manager 424 may not have control of the network QoS allocation for the related services.

Figure 5:
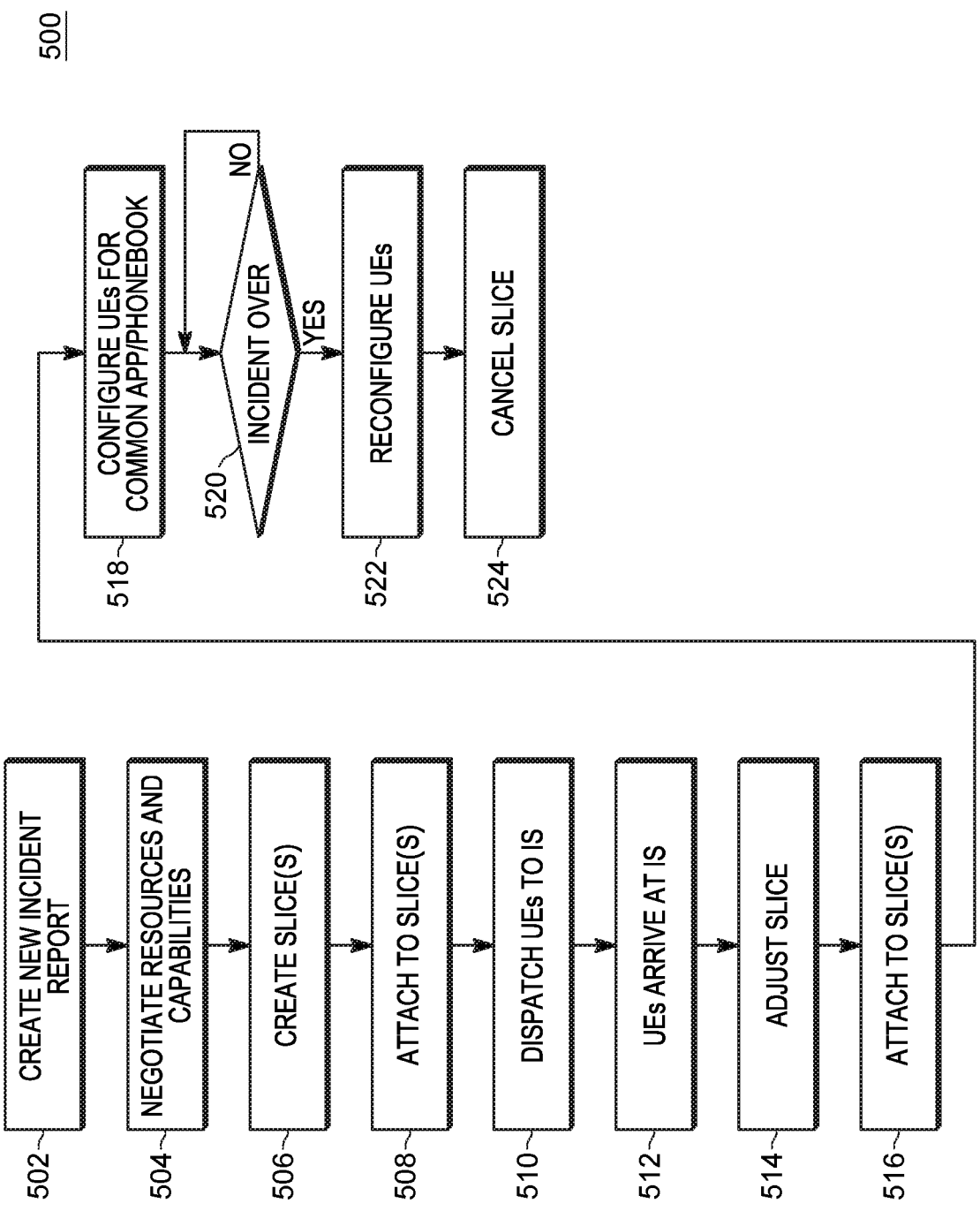
FIG. 5 illustrates a network slicing lifecycle for an incident scene according to some embodiments.

FIG. 5 illustrates a network slicing lifecycle for an incident scene according to some embodiments. Some operations shown may not be present in other embodiments. Similarly, other steps may be undertaken but are not shown for convenience in this embodiment, as well as other embodiments. The order of the steps may also be different than that shown.

As shown, at operation 502 of method 500, a new incident report may be generated by the incident manager in response to the incident manager receiving an indication of a new incident. Other information may be included in the incident report, including the type of incident, location of the incident scene, geolocation or geofence of the incident, and unique incident code that identifies the incident for later use by mobile UEs that have arrived at the incident scene.

The incident manager may determine from the indication and other information, described in more detail below, the types of agencies from which to request resources and specific agencies of the agency types from which to request resources, as well as an amount and type of resources from each agency. At operation 504, the incident manager may subsequently negotiate with the agency console(s) of the various agencies for the resources and capabilities to be used at the incident scene. As described, as the resources requested by the incident manager to a particular agency console may not be able to be met using the available resources of the particular agency, the incident manager and agency console may thus negotiate the resources of the agency to be used at the incident scene, allowing the incident manager to communicate with another agency console of one or more different agencies to obtain the additional resources.

Once the resources and capabilities have been negotiated, the incident manager may determine the number and properties (e.g., resources) of the network slice(s). Then, at operation 506, the incident manager may communicate the desired network slices and capabilities to the network slice orchestrator. The network slice orchestrator may in response create one or more network slices for use by UEs at the incident scene and provide slice identification (ID) information to the incident manager.

The incident manager may provide slice information, including the slice IDs, to the agency console(s) and fixed UEs to provide information during the incident at the incident scene. At operation 508, the incident manager may control one or more of the fixed UEs at the incident scene such that each of these fixed UEs is able to a PDU session/ attach to the proper slice(s) of the 5G network using the slice IDs provided. The fixed UEs may include cameras and IoT sensors, such as temperature sensors or hazardous gas sensors, for example.

At operation 510, each of various agencies from which the incident manager has negotiated resources may select users (and associated mobile UEs). The selected users/UEs may be dispatched by the associated agency to the incident scene.

At operation 512, the users and mobile UEs may arrive at the scene. The mobile UEs may indicate that they have arrived at the incident and request joining the incident network (or merely join the incident) via transmission of an electronic communication. For example, a user may call a predetermined phone number or send an SMS to a number associated with the incident using the mobile UE, providing an indication to the incident manager that the mobile UE has arrived. The number may be provided by the incident manager with the incident code. The information provided to the incident manager may include the incident code.

In response to receiving the join incident request from the mobile UE, at operation 514, the incident manager may communicate with the network slice orchestrator. The incident manager may, in some cases, request that the network slice orchestrator adjust the network slices based on the UE capabilities; in other cases, the incident manager may request that the network slice orchestrator create a new network slice based on the UE capabilities.

After sending the join incident request to the incident, at operation 516, the mobile UE may receive a notification from the incident manager that the join incident request has been accepted. The join incident request may include the slice ID of each slice to which the mobile UE is to establish a PDU session/attach. In response to receiving the accepted join incident request, the UE may establish a PDU session/ attach to the network slice.

After joining the slice(s), at operation 518, the mobile UE may install one or more common applications used for interagency communication. The common application(s) may use a common phonebook for all UEs at the incident scene. Alternatively, the mobile UE may install the common application(s) prior to arrival at the incident scene.

The mobile UEs may continue to operate at the incident scene using the network slice(s) to which they are respectively connected until it is decided, at operation 520, that the incident has ended/the agencies may leave the incident scene. At this point, the number called by the UEs may close or the UEs may leave the incident. The UEs, whether fixed or mobile, may then be reconfigured to their original state at operation 522. The network slice(s) may also be cancelled at operation 524, thereby freeing up the network resources.

The incident manager may thus gather relevant information from available sources and determine fixed and mobile UEs to participate in the response to an incident based on incident-type and location, among others. The incident manager may also determine the services (including QoS) for handling the incident, based on the incident type, the UE and network capabilities, and UE role and mission. The incident manager may further determine the network resources, network functions, interfaces and configurations for the network slice(s) that cover the incident scene to provide the desired services (including QoS) that match the incident type, participating mobile devices capabilities and UE mission. Based on incident type changes in time and participating UEs (with various roles and capabilities) arrival and departure, the incident manager may determine when and how many network slices are to be created, when and how many network slices are to be reconfigured, and when and how many network slices are to be decommissioned.

Figure 6:
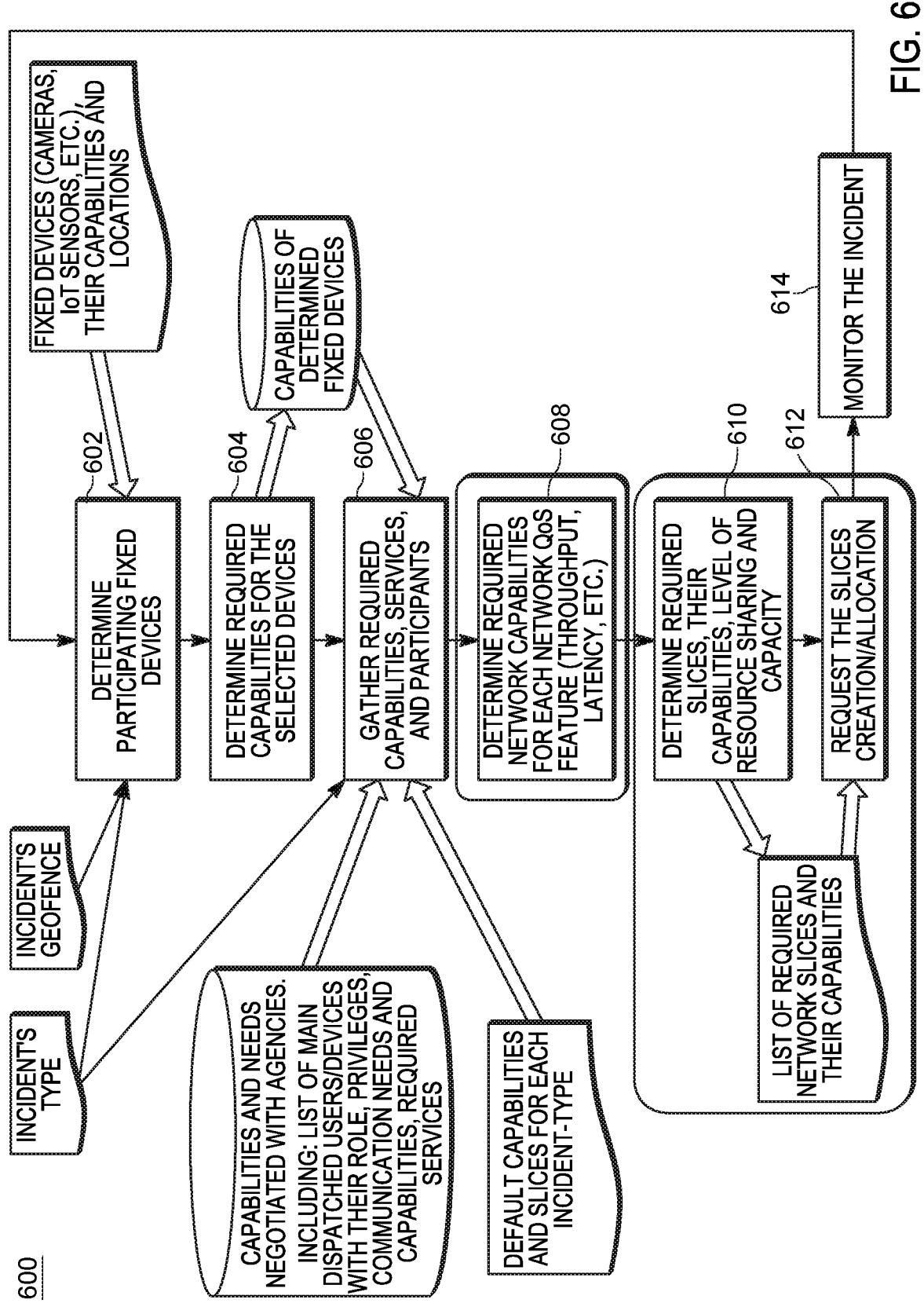
FIG. 6 illustrates creation of network slices for an incident according to some embodiments.

FIG. 6 illustrates creation of network slices for an incident according to some embodiments. FIG. 6 illustrates operations undertaken by the incident manager. Some operations shown may not be present in other embodiments. Similarly, other steps may be undertaken but are not shown for convenience in this embodiment, as well as other embodiments. The order of the steps may also be different than that shown.

At operation 602 of method 600, the incident manager receives an indication, via an electronic communication, of a new incident at an incident scene. The electronic communication may also provide the geolocation (or geofence) of the incident scene. Each of the fixed UEs at the incident scene that is capable of detecting and communicating the occurrence of the incident may transmit such an indication through the 5G network. As above, the fixed UE may also provide its geolocation, and thus the geolocation of the incident. The geolocation of the fixed UE, if not provided by the fixed UE itself, may instead be determined by the incident manager based on an accessible lookup table that associates the fixed UE ID with the location of the fixed UE. Such as lookup table may be local to or remote from the incident manager and may be periodically updated as the fixed UEs are added, removed, or moved and/or after a predetermined time period. In addition to providing location information, the fixed UE may provide its capability information, e.g., communication, video, and audio capabilities, among others. For example, the fixed UE may merely provide an indication that the fixed UE is able to provide video at the incident scene, or may, in addition, provide the actual video capabilities such as resolution, frame rate, and area covered by the video. In other embodiments, transmission of the fixed UE information by the fixed UEs to the incident manager may be triggered by another UE or user at the incident scene, or may be gathered by a coordinator UE at the incident scene (after the incident is detected) before being transmitted by the coordinator UE to the incident manager. In some embodiments, each agency may have its own coordinator UE, which may be the UE used by the user having the highest privilege.

Alternately, after the incident manager is notified of the occurrence of an incident, the incident manager may trigger location and capability reporting by each fixed UE (or at least each non-reporting fixed UE) at the incident scene via a predetermined command transmitted to each fixed UE through the 5G network. The incident manager may use the lookup table to determine fixed UEs at the incident scene. As the fixed UE resources may have changed, this may help the incident manager to determine and request the correct resources from the various agencies based on the latest fixed UE information.

The processor in the incident manager may eliminate duplicate information provided in the indication of the new incident at the incident scene and the fixed UEs and/or coordinator UE that has been gathered at the incident manager by matching reported time, location, and capability information provided by the different UEs for indications of the same event such that the incident manager does not duplicate responses to the same incident. Thus, for example, if different fixed UEs inadvertently report the same incident at different times, but within a predetermined period after initial reporting of the incident (e.g., prior to an indication of termination of the incident), the incident manager may ignore the duplicate communication.

The incident manager, having received the electronic communication and the fixed UE information, may determine at operation 604 the fixed UEs and agencies (and resources within the agencies) to be used at the incident, as well as the capacities of these various UEs. The fixed UE capabilities may be stored in a memory, which in some embodiments may be local to the incident manager or in other embodiments may be remote from the incident manager.

After negotiating with the agency consoles for the resources and capabilities to be used at the incident scene, the incident manager may at operation 606, gather information prior to interacting with the 5G network. This information may include the UEs to be present at the incident scene, as well as the capabilities of and services used by these UEs. The information of the mobile UEs may be obtained by the incident manager during negotiation with the agency consoles of the various agencies. Each agency console may, for example, provide to the incident manager a list of UEs (and possibly users) to be dispatched to the incident scene with their roles (e.g., on-site coordinator or manager of the incident scene groups, specific PTT group manager or member), privileges (e.g., with which agencies the UE is to be able to communicate, whether the UE has the ability to add or modify a group of subscribers), communication needs and capabilities (e.g., video, processing power of the UEs), and services to be used by the UEs when deployed at the incident scene.

In some embodiments, the incident manager may have determined a set of default capabilities and network slices for each incident type prior to receiving the indication of the incident. This default information may be stored, as above, in a lookup table in a database local to and/or remote from the incident manager. The incident manager may thus also obtain, from the database, the set of default capabilities and network slices for the reported incident. For example, an incident type that indicates a fire may have default capabilities and network slices set to a one-alarm fire. However, the actual incident may be a two-alarm fire or combination of a fire and another incident (e.g., car accident). In either case, the default capabilities and network slices may be modified as additional capabilities and/or network slices may be initially determined to be relevant or duplicate capabilities and/or network slices may be eliminated. In the example above, a response to a fire and car accident may both involve resources, but neither the initial network slice resources for the fire nor the car accident alone may be sufficient; thus, the incident manager may determine that the default capabilities and slices may be modified for the reported incident.

Accordingly, once the resource information has been gathered by the incident manager from the agency consoles and the fixed UEs, the incident manager may at operation 608 determine the QoS parameters for the overall network services. That is, the incident manager may determine parameters such as bandwidth, throughput, and latency, among others, for each QoS feature.

The incident manager may then use the network capabilities for each QoS feature, as well as for the default capability and network slice information, to determine at operation 610 the parameters for each network slice. The incident manager may thus determine specific network slices to be created, along with the capabilities of each network slice. These capabilities, as indicated above, may be different depending on the particular slice created as the number (and type) of UEs present at the incident scene that are to use the slice may be different. The network slices and capabilities of each network slice may be stored in a database, which again may be local to, or remote from, the incident manager.

Having determined the network slice parameters, at operation 612, the incident manager may use this information to request from the network slice orchestrator creation of the network slices and allocation the network resources. After transmitting the request, the incident manager may continue to monitor the incident scene at operation 614 to determine whether the UEs at the incident scene have changed sufficiently to merit a change in the network slice parameters, in which case the incident manager updates the network slice orchestrator to adjust one or more of the network slices.

Figure 7:
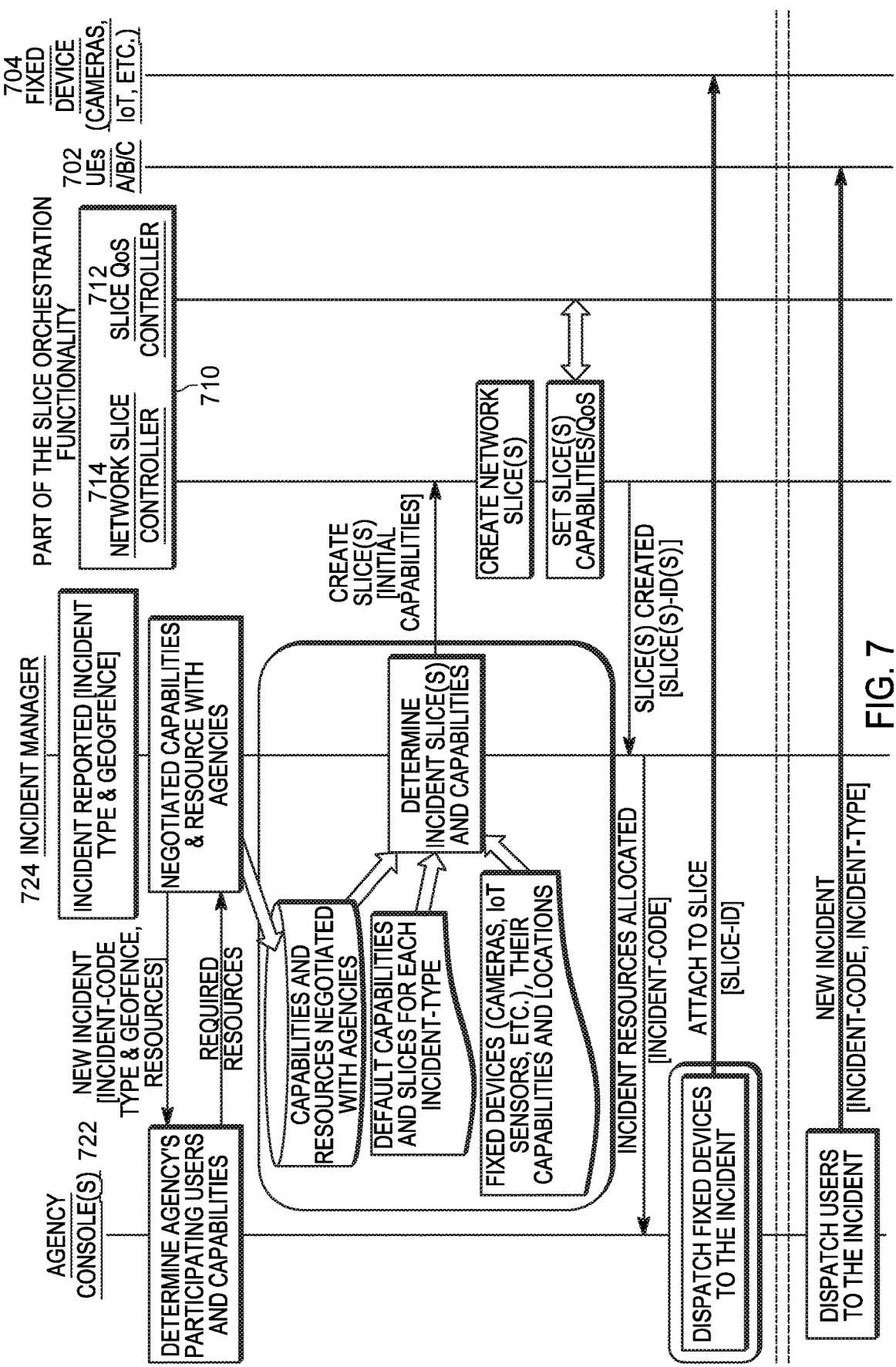
FIG. 7 illustrates message flow during creation of network slices for an incident according to some embodiments.

The initial phase of this process is shown in FIG. 7, which illustrates message flow during creation of network slices for an incident according to some embodiments. Some communications may not be shown for convenience in this embodiment, as well as other embodiments.

As above, incident manager 724 may determine the occurrence of an incident to which first responders are to be dispatched. Incident manager 724 may determine the occurrence from reception of a communication from an individual, e.g., from a mobile UE, or a communication from a fixed UE. In response incident manager 724 may generate an incident report. The incident report may be created by a human dispatcher or may be created automatically by a processor in response to reception of the communication. In some embodiments, the actions of incident manager 724 may be performed in response to a trigger generated based on a dispatch assignment performed at a computer-aided dispatch device (not shown). The electronic communication may be provided from one or more UEs or other devices, e.g., a phone call/SMS message/email from a user UE, data and/or an alert from a sensor or other IoT UE. The electronic communication may indicate the type of incident to which first responders (e.g., EMTs, fire, police, bomb squad) from one or multiple different agencies are to be dispatched. The incident type in the incident report may be selectable from a number of different incidents for which the first responders from one or multiple different agencies are to be dispatched, e.g., fire, car accident, hazmat, terrorist, although this list is not to be taken as exhaustive.

In some embodiments, the electronic communication may also provide the geofence of the incident scene. The geofence may be determined using location data, e.g., GPS data, sensor data from the reporting UEs, and/or other data or information provided to the incident manager, or may be provided by the electronic communication itself. The initial indication of the incident may, in some cases, automatically include the location information in the electronic communication. Alternatively, or in addition, the location information may be conveyed by a user of the UE, through additional further communications between the incident manager and the UE (e.g., if requested by the incident manager), or from one or more fixed UEs at the incident scene.

Each of the fixed UEs at the incident scene that is capable of detecting and communicating the occurrence of the incident may transmit such an indication through the 5G network. As above, the fixed UE may also provide its geolocation, and thus the geolocation of the incident. The geolocation of the fixed UE, if not provided by the fixed UE itself, may instead be determined by the incident manager based on an accessible lookup table that associates the fixed UE ID with the location of the fixed UE. Such as lookup table may be local to or remote from incident manager 724 and may be periodically updated as the fixed UEs are added, removed, or moved and/or after a predetermined time period. In addition to providing location information, the fixed UE may provide its capability information, e.g., communication, video, and audio capabilities, among others. For example, the fixed UE may merely provide an indication that the fixed UE is able to provide video at the incident scene, or may, in addition, provide the actual video capabilities such as resolution, frame rate, and area covered by the video. In other embodiments, transmission of the fixed UE information by the fixed UEs to the incident manager may be triggered by another UE or user at the incident scene, or may be gathered by a coordinator UE at the incident scene (after the incident is detected) before being transmitted by the coordinator UE to incident manager 724.

Alternately, after incident manager 724 is notified of the occurrence of an incident, incident manager 724 may trigger location and capability reporting by each fixed UE (or at least each non-reporting fixed UE) at the incident scene via a predetermined command transmitted to each fixed UE through the 5G network. Incident manager 724 may use the lookup table to determine fixed UEs at the incident scene. As the fixed UE resources may have changed, this may help incident manager 724 to determine and request the correct resources from the various agencies based on the latest fixed UE information.

The processor in incident manager 724 may eliminate duplicate information provided in the indication of the new incident at the incident scene and the fixed UEs and/or coordinator UE that has been gathered at incident manager 724 by matching reported time, location, and capability information provided by the different UEs for indications of the same event such that the incident manager does not duplicate responses to the same incident. Thus, for example, if different fixed UEs inadvertently report the same incident at different times, but within a predetermined period after initial reporting of the incident (e.g., prior to an indication of termination of the incident), incident manager 724 may ignore the duplicate communication.

Incident manager 724 may negotiate with the agency console(s) of the various agencies for the resources and capabilities to be used at the incident scene after determining the agencies to request resources and amount of resources from each agency from the electronic communication and the fixed UE information. Incident manager 724 may transmit to agency console(s) 722 the incident type, the incident code that identifies the incident, the geolocation of the incident, and the requested resources.

Each agency console 722 may, in response to reception of the information from incident manager 724, provide available resources of the UEs associated with the agency and capabilities of these resources to incident manager 724. Each agency console 722 may, for example, provide to incident manager 724a list of main dispatched users/UEs with their roles (e.g., on-site coordinator or manager of the incident scene groups, specific PTT group manager or member), privileges (e.g., with which agencies the UE is to be able to communicate, whether the UE has the ability to add or modify a group of subscribers), communication needs and capabilities (e.g., video, processing power of the UEs), and services to be used by the UEs when deployed at the incident scene. As described above, as the resources requested by incident manager 724 to a particular agency console may not be able to be met using the available resources of the particular agency, incident manager 724 and agency console 722 may thus negotiate the resources of the agency to be used at the incident scene, allowing incident manager 724 to communicate with another agency console of one or more different agencies (whether of the same type or different) to obtain the additional resources. The other agency may be of the same type as the agency unable to fulfill the request (e.g., fire department), or may be of a different type if the additional resources are able to be obtained from the other agency.

Similar to the above, incident manager 724 may use a resource lookup table to determine agency console 722 of the appropriate agency from which to request the resources or the additional resources if the agency from which the resources are requested is unable to entirely fulfill the request. The lookup table may be used by incident manager 724 to determine a prioritized list (e.g., by geographic proximity to the incident scene) of agency consoles 722 with which to communicate. Alternatively, a single agency console 722 may be associated with a particular geographic area and may make the determination of which agency to contact based on geographic location.

Agency console(s) 722 may provide incident manager 724 with the agency and resource information. Once the resources have been negotiated between incident manager 724 and agency console(s) 722, this information may be used by incident manager 724 along with default network capabilities and network slice information for the type of incident and the fixed UE capability and location information. Specifically, incident manager 724 may use the combined information to determine the network slices to be created (as indicated above, a video slice and a PTT/IoT slice, for example), along with the capabilities (e.g., bandwidth, throughput, and latency) of each network slice.

Incident manager 724 may transmit a request to network slice controller 714 of network slice orchestrator 710 to create one or more network slices. The request may indicate initial network slice capabilities of each of the network slice requested, and in some cases provide the incident code to be associated with each of the network slices. The network slice capabilities may, for example, enable certain network functionalities (e.g., types of phone calls/data interactions) and disable other network functionalities. Network slice controller 714 may communicate with slice QoS controller 712 of network slice orchestrator 710 to set the QoS characteristics/capabilities of each network slice. Each network slice created by network slice controller 714 may be compliant with the incident type, roles, and limitations of the UEs (fixed and from the different agencies) at the incident scene during the incident. One such limitation may include communication with an application server running a common application used for interagency communication. The common application may be supported by, and within the capability of being run on, all UEs at the incident scene. One such role of the mobile UEs may be a commander UE that is able to permit or deny access to the PTT group using the common application.

Once the network slice(s) having the desired network slice capabilities are created by network slice orchestrator 710, network slice orchestrator 710 may provide a slice ID for each slice to incident manager 724 along with the incident code for the incident if provided by incident manager 724 to network slice orchestrator 710; otherwise incident manager 724 may link the slice ID(s) to the incident code based on, for example, timing between the request and the response (e.g., no other requests were sent by incident manager 724 to network slice orchestrator 710).

Incident manager 724, having received the network slice ID(s), may in turn transmit to agency console(s) 722 a slice indication indicating that the incident resources have been allocated. As shown in FIG. 7, the slice indication may include the appropriate slice ID(s) as well as the incident code.

Incident manager 724 may transmit the slice ID(s) to fixed UEs 704 dependent on to which of the network slice(s) each fixed UE 704 is to establish a PDU session/attach. This information may thus allow fixed UEs 704 to establish a PDU session/attach to the appropriate network slice(s). Incident manager 724 may transmit the slice ID(s) to fixed UEs 704 either before or after transmitting the slice indication to agency console(s) 722.

Similarly, each agency console(s) 722 may provide the same incident code to mobile UEs 702. Agency console(s) 722 may provide the incident type to mobile UEs 702. This information may allow mobile UEs 702 to indicate when they have arrived at the incident scene. Note that at least some of various communications described herein may involve, for example, generation of a particular message by the processing circuitry of the transmitting entity, as well as encoding and scrambling (among others) of the message prior to transmission of the message. Similarly, the processing circuitry of the receiving entity may decode, descramble, and perform other processing operations on the message after reception of the message to allow the message to be interpreted and otherwise used.

Figure 8:
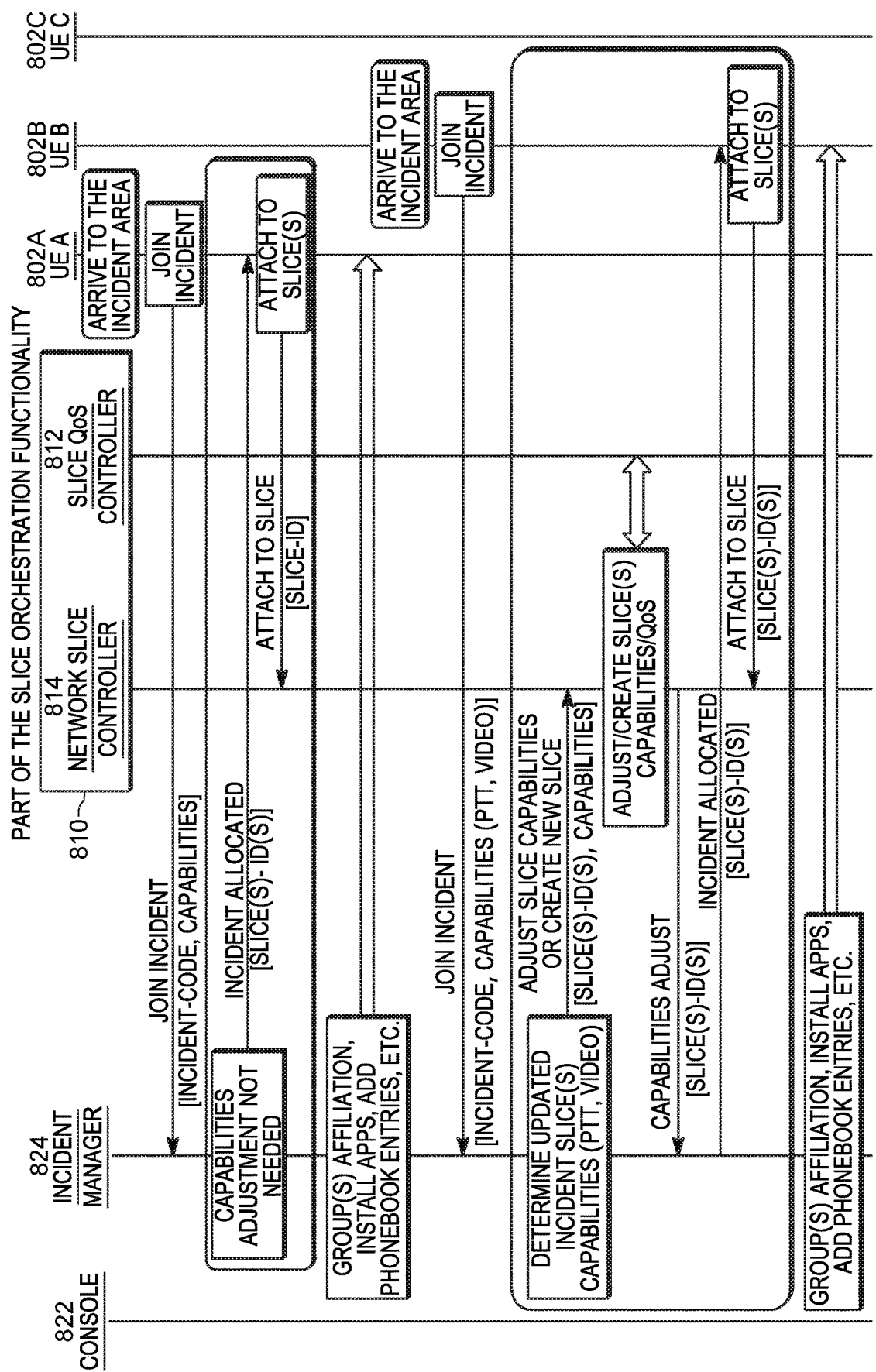
FIG. 8 illustrates message flow during joining by UEs at an incident according to some embodiments.

FIG. 8 illustrates message flow during joining by UEs at an incident according to some embodiments. Some communications may not be shown for convenience in this embodiment, as well as other embodiments.

A first UE 802a of UEs 802a, 802b, 802c dispatched by one of the agency consoles 822 may arrive at the incident scene. Upon arriving, first UE 802a may transmit a join request to incident manager 824. The join request may be, for example, a PTT input signal from a PTT depress on first UE 802a. The join request may include the incident code and the capabilities of first UE 802a. In some embodiments, separate join requests may be provided for different services, such as PTT services, mission critical video, mission critical messaging, and mission critical IoT control and measurement messaging, for each of which specific PTT numbers or other, non-PTT communications may be used. The join request may be initiated by first UE 802a sending a predetermined electronic communication (e.g., text, phone call). Incident manager 824 may not interact with agency console 822 during joining of mobile UEs 802a, 802b, 802c.

Incident manager 824, after receiving the join request from first UE 802a may review the capabilities of the network slice(s) to which the first UE 802a is to establish a PDU session/attach. In particular, incident manager 824 may make a determination whether or not the network slice(s) to which the first UE 802a is to establish a PDU session/attach is able to support first UE 802a. In this case, as shown, incident manager 824 determines that the network slice(s) to which first UE 802a is to establish a PDU session/attach is able to support the capabilities of first UE 802a, and thus that no adjustment of any of the network slice(s) to which first UE 802a is to establish a PDU session/attach is to be undertaken. In response to this determination, incident manager 824 may transmit a join response to the first UE indicating that first UE 802a is permitted to establish a PDU session/attach to the network slice(s). The join response may provide the slice ID of each slice to which first UE 802a is to establish a PDU session/attach. In other embodiments, as above, the URSP from the PCF in the 5G core may provide first UE 802a with the slice ID of the NSSAI.

Alternately, rather than communication of a PTT depress, the join request to incident manager 824 may be a manual or automatic network slice join request or another trigger used to initiate subsequent actions. Such a trigger may be arrival of responder/first UE 802a at the incident scene, determined using, e.g., GPS coordinates of first UE 802a or identification by the network provider of responder/first UE 802a from a SIM module (which may be then used to connect first UE 802a to the desired slice).

First UE 802a, having received the join response approving joining of one or more of the slices, may attempt to establish a PDU session/attach to each slice identified by the slice ID(s). Such a procedure of first UE 802a, for example, may include first UE 802a transmitting an establish PDU session/attach request to network slice controller 814 of network slice orchestrator 810 (which also contains slice QoS controller 812). The establish PDU session/attach request may include the slice ID(s). Network slice controller 814 may be part of the service instance layer shown in FIG. 3B.

In some embodiments, the procedure of first UE 802a may include first UE 802a transmitting a random access preamble to a gNB of each slice, and in response receiving a DCI format_1 scrambled using a random-access radio network temporary identifier (RA-RNTI) in a physical downlink control channel (PDCCH) and subsequently receiving a random access response (RAR) indicating a timing advance, an uplink grant, and a temporary cell RNTI (C-RNTI). The first UE 802a may then transmit, using the uplink grant, a radio resource control (RRC) setup request containing the UE identity and the reason for establishing the PDU session/attachment (establishment clause). The gNB may in response to the RRC setup request send an uplink grant in a DCI format 1 scrambled using the C-RNTI in a PDCCH and then send an RRC setup message using the default signaling radio bearer (SRB_1) indicating the radio bearer configuration and cell group information, at which point the first UE 802a may be in the RRC connected mode. The first UE 802a may subsequently receive another uplink grant in a DCI format_1 scrambled using the C-RNTI in a PDCCH from the gNB and in response transmit an RRC setup complete message containing a non-access stratum registration request. In this case, the slice ID(s) may be contained in one or more of the uplink messages to the gNB. In embodiments in which different gNBs are used for different network slices with which the first UE 802a is associated, first UE 802a may establish the PDU session/attach to the gNBs using independent attach procedures for each gNB.

After first UE 802a has established the PDU session/attached to the network slice(s), incident manager 824 may provide group and application information to first UE 802a. In some embodiments, incident manager 824 may provide to first UE 802a and/or network slice orchestrator 810 one or more group affiliations for PTT or other groups with which first UE 802a is to be associated at the incident scene, as well as information to permit first UE 802a to install the common application used for interagency communication (if not already installed), as well as phonebook entries (i.e., addressing information) in the common phonebook for all UEs at the incident scene. The phonebook entries of all UEs at the incident scene may be periodically updated and/or may be updated as UEs join and leave the incident scene (or different groups). The phonebook entries may be obtained by incident manager 824 from agency consoles 822 prior to any of the UEs arriving at the incident scene or may be updated as UEs join the network slice(s).

In some embodiments, incident manager 824 may provide the group and application information via a 5G connection that is separate from the network slices set up for the incident. In this case, the group and application information may be provided prior to one or more of the UEs 802a, 802b, 802c arriving at the incident scene. For example, it may be beneficial to provide the group and application information to the mobile UE of the incident scene commander prior to arrival at the incident scene, perhaps updating the phonebook information upon establishment of the PDU session/attachment.

After first UE 802a has established the PDU session/attached to the network slice(s) (and perhaps used the group and application information), a second UE 802b of the UEs 802a, 802b, 802c dispatched by one of the agency consoles 822 may arrive at the incident scene. The agency console 822 that dispatches second UE 802b may be the same as or different from the agency console 822 that dispatches the first UE 802a. After arrival, second UE 802b may transmit a join request that includes the incident code and the capabilities of second UE 802b to incident manager 824 using the predetermined electronic communication. As shown, the capabilities of second UE 802b may include both PTT communications and video capture and transmission capability.

Incident manager 824, after receiving the join request from second UE 802b, may determine whether or not the network slice(s) to which second UE 802b is to establish the PDU session/attach is able to support second UE 802b. In this case, as shown, incident manager 824 determines that the network slice(s) to which second UE 802b is to establish the PDU session/attach is unable to support the capabilities of second UE 802b (e.g., unable able to transmit video with the desired characteristics), and thus that at least one of the network slice(s) to which second UE 802b is to establish the PDU session/attach is to be adjusted or created. Thus, in some cases, multiple network slices may be created and/or adjusted.

In response to this determination, incident manager 824 may communicate with network slice controller 814 to request creation or adjustment of one or more of the network slices. The request from incident manager 824 to network slice controller 814 may include the slice ID(s) and the characteristics of the network slice(s). In response to reception of the request, network slice controller 814 may communicate with slice QoS controller 812 to create or adjust the network slice(s), providing the slice ID(s) and the characteristics of the network slice(s) to be created or adjusted.

After creation or adjustment of the network slice(s), network slice controller 814 may provide a response to incident manager 824 indicating that the one or more of the network slices have been adjusted and/or created. The response may include the slice ID(s). In response to reception of the notification from the network slice controller that the network slice(s) have been created/adjusted to meet the capability for second UE 802b, incident manager 824 may transmit a join response to second UE 802b indicating that second UE 802b is permitted to establish the PDU session/attach to the network slice(s). The join response may provide the slice ID of each slice to which second UE 802b is to establish the PDU session/attach.

Second UE 802b, having received the join response approving joining of one or more of the slices, may attempt to establish the PDU session/attach to each slice identified by the slice ID(s). Second UE 802b may transmit a request to establish the PDU session/attach including the slice ID(s) to network slice controller 814 of network slice orchestrator 810 to establish the PDU session/attach to the network slice(s) that have been created/adjusted. After second UE 802b has established the PDU session/attached to the network slice(s), incident manager 824 may provide group and application information to second UE 802b.

In some embodiments, network slice controller 814 may configure UEs 802a and 802b based on the information received from incident manager 824. For example, if the agencies operate on different frequencies, the 5G network may use each agency frequency, one at a time, to reconfigure all UEs to a common modem configuration and frequency (e.g., reconfiguring the UEs to use specific RF bands, as well as other physical layer characteristics). Network slice controller 814 may configure the use of the common PTT application with a common phone book and the UE role and privileges during the incident. Network slice controller 814 may also install other common applications that enable collaboration such as providing access to various databases or providing the location of the various agents.

Figure 9:
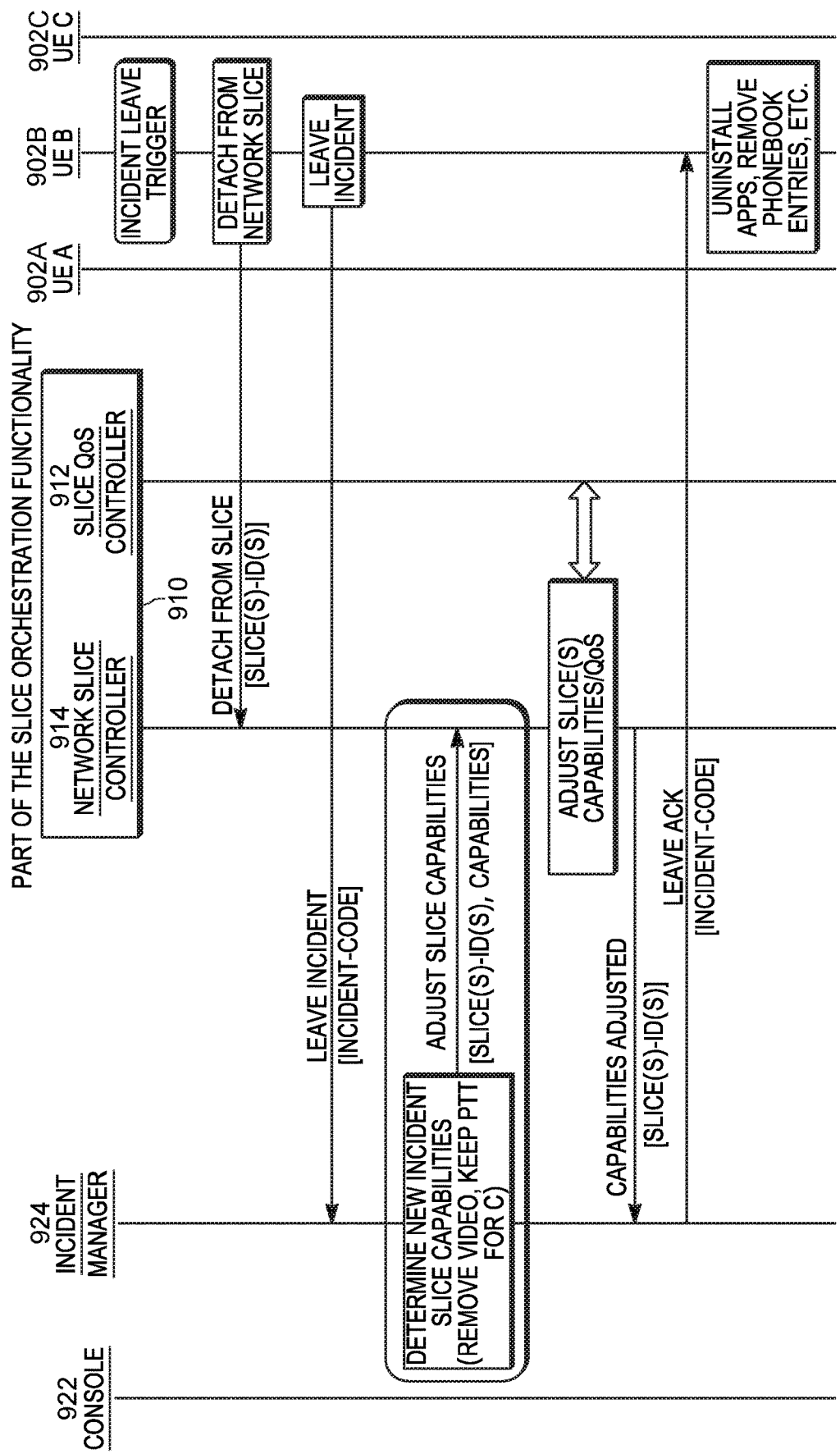
FIG. 9 illustrates message flow during leaving by UEs at an incident according to some embodiments.

The incident manager may continue to monitor the incident scene until the incident is terminated. This monitoring may include interaction with the network slice orchestrator at various points based on the arrival or departure of one or more of the mobile UEs. FIG. 9 illustrates message flow during leaving by mobile UEs at an incident according to some embodiments. Some communications may not be shown for convenience in this embodiment. As shown, second UE 902b of the UEs 902a, 902b, 902c may receive a trigger to leave the incident. The trigger may indicate, for example, that second UE 902b is no longer assigned (or has been reassigned) to the incident, and thus that second UE 902b is to disconnect from the network slice In response to reception of the trigger, second UE 902b may transmit different communications to incident manager 924 and to network slice controller 914 of network slice orchestrator 910. In some embodiments, second UE 902b may transmit a leave incident request containing the incident code to incident manager 924 and a request to terminate the PDU session or detach containing the slice ID(s) of the network slice(s) to which second UE 902b has established the PDU session or is attached to network slice controller 914. As with joining, incident manager 924 may not interact with agency console 922 during departure of second UE 902b. In some embodiments, the leave incident request may be a PTT input signal.

Incident manager 924, after receiving the leave incident request from second UE 902b, may review the capabilities of the network slice(s) to which second UE 902b has established the PDU session/is attached based on the capabilities of second UE 902b to determine whether or not the network slice(s) to which second UE 902b has established the PDU session/is attached are to be adjusted or eliminated.

If incident manager 924 determines that the network slice(s) to which second UE 902b has established the PDU session/is attached is to be adjusted, incident manager 924 may send a request containing the slide ID(s) and capabilities to network slice controller 914. Incident manager 924 may send the new capabilities or only the change to be made from the existing capabilities of the network slice(s). Network slice controller 914 in turn indicates to slice QoS controller 912 to adjust the capabilities/QoS of the network slice(s), which may then alter the identified network slice(s) and provide an indication of the alteration to network slice controller 914.

After the capabilities of the network slice(s) have been adjusted, network slice controller 914 may transmit an indication that the capabilities of the network slice(s) have been adjusted to incident manager 924. Incident manager 924 may then transmit a leave acknowledgement response to second UE 902b, indicating that second UE 902b is permitted to leave to the network slice(s). Second UE 902b, having received the leave acknowledgement response, may return to its original state before arriving at the incident scene, uninstalling the common application and eliminating the common phonebook entries, for example.

Although FIG. 9 illustrates initiation of second UE 902b leaving the network slice may be initiated by reception of a leave trigger (command), in some embodiments, the non-commander UEs may be configured by agency console 922 or incident manager 924 with a personal termination/leave code. In this case, the personal code may be used by second UE 902b if second UE 902b determines to depart the incident scene prior to reception of the trigger (i.e., termination of the incident by the commander UE). Second UE 902b may send the personal code along with the incident code to incident manager 924, rather than sending the incident code alone.

In some embodiments, second UE 902b may receive a trigger that provides an indication that the incident has ended, and that the UE is to leave the incident scene. The trigger may be, for example, an electronic communication initiated by the commander UE that the incident has ended or that the user of the UE is to depart the incident scent. For example, when the incident ends, a single commander UE may send a predetermined close/termination code or a predetermined "leave incident" command with the close/termination code to incident manager 924 through the appropriate network slice. Alternatively, the UEs of the highest privileged users from each of the agencies may send the code or "leave incident" command with the code to incident manager 924. This transmission may trigger issuance of a command from incident manager 924 for the remaining UEs to terminate the PDU session/detach from the network slice(s) and eventual reversion of the UEs to their original state (e.g., stored by the network slice) and decommissioning of the network slice after termination of the PDU session/detachment of the commander UE(s).

Thus, in one example, an incident may start with a call to an emergency number, such as 911. The incident manager (human dispatcher and/or automated dispatch system) associated with the emergency number may make an initial decision about the emergency or public safety incident type (e.g., terrorist, car accident, hazmat, etc) and allocate an incident code, which may be based on the incident type. The incident manager may identify fixed devices (e.g., cameras, IoT sensors) that are present (and are to be used) based on the location of the incident and resources to be used based on the incident type. The incident manager may subsequently alert the relevant first responder agencies and the service provider (network orchestrator) covering the area of the incident scene, communicating the incident code and incident type to the agencies (and eventually to the network orchestrator). The incident manager may in particular determine the desired resources (e.g., number of responders/devices, network and device capabilities) to be used from the different agencies based on the incident, before negotiating the resources with the agencies. The agencies may send their available resources and relevant information to the network orchestrator via the incident manager. The agencies may also send unique user IDs of users to be dispatched and their roles to the incident manager. The incident manager may thus store and use incident attributes including the incident code, incident context (e.g., incident type, severity, and geographical area), user profiles (e.g., user rank, role) and communication device capabilities associated with the first responders, and network services to be provided corresponding to the incident.

The incident manager may control the network orchestrator of the LocalNet to, in turn, instantiate one or more network slices and configure the network slice(s) based on the information from the agencies and the type of incident. The network slices may support one or more of URLLC, eMBB, and MTC (or massive MTC) communications. The network slices may be created either prior to the first UE arriving at the incident scene (e.g., after the incident manager determines the incident slices to be used and the capabilities of each slice and prior to the UEs being dispatched by the agencies) or in response to arrival of the first UE at the incident scene. The network slices may be dedicated by the network orchestrator to communications at the incident scene. The network orchestrator may notify the incident manager with the IDs of the network slices created and the capabilities of each network slice. The incident manager may, in turn, provide the information from the network orchestrator to the agencies. The incident manager may control the network orchestrator to change the slice configuration dynamically during the incident, based on UEs joining the event and the incident development.

The incident manager may reconfigure the UEs at the incident scene to support common applications such as a PTX application using a common phonebook, including all the UEs identified on the scene. Different slices may support different applications (IoT/mMTC). In some embodiments, the original applications (and phonebooks) on the UEs may be removed (and stored by the incident manager, for example), while in other embodiments the original applications may remain but may be rendered inactive/unable to be used until further reconfiguration. The selection of the common applications used by each UE may be based on the reported UE capabilities. Some of the UEs may get additional features and rights, based on information received from the home network of the UE and/or UE role.

In some embodiments, each UE assigned to the incident scene may be limited to joining communication at the incident only when the user of the UE is available (for example, has entered a personal code into the device) and/or only after arriving at the incident scene (and the UE sending a join request). In some further embodiments, the incident scene manager may receive information about one or more visiting UEs and configured the visiting UEs for the incident, including allowing the visiting UEs to install the common application, common phonebook and/or configuration. The incident scene manager may receive the visiting UE information via a separate communication from one or more of the agency consoles or the coordinator UE (or from the visiting UE itself) after arrival of the visiting UE at the incident scene. The information may contain some or all of UE identification information, a special code for adding a visiting UE, the incident code, and the visiting UE capabilities for the network slice(s) that the UE is to use.

When the incident is over or when otherwise instructed, the UEs may depart from the incident scene. In some embodiments, the UEs may be reconfigured to their original state upon leaving the incident. UEs may, in general, leave the incident either by sending a PTT communication to a predetermined "leave" number or by sending a "leave" command to the incident manager. As above with regard to the join request, separate leave requests may be used for different services (e.g., PTT services, mission critical video, mission critical messaging, and mission critical IoT control and measurement messaging), for each of which specific PTT numbers or other, non-PTT communications may be used. In some embodiments, certain events may be triggered only when a specific UE leaves the incident. The specific UE may have a particular role or be the highest-ranking UE (of a particular agency or of all agencies). When the specific UE of each and every agency leave the incident, or, if a uniform command structure is used for the incident, when the highest-ranking UE/overall commander of the overall incident leaves. At this point, the network slice(s) dedicated to the incident may be decommissioned by the network orchestrator based on instructions from the incident manager. In some embodiments, the UEs of a particular agency that have not left the incident may be reconfigured to their original state (e.g., to use the original applications and phonebooks) when the specific UE from that agency leaves the incident.

Examples of slices used for different incident types include, for example, a terrorist incident, a hazmat incident (e.g., hazardous material leak), and an automotive accident incident. At a terrorist incident scene, URLLC and eMBB communications may be used, in which PTX communications may be used for the common phone book. The UEs at the terrorist incident scene may use access to cloud databases, a command center, and street video cameras. The network slice(s) may disable voice calls but enable emergency calls and call features (e.g., destination) to be used. Performance for URLLC and eMBB communications at the terrorist incident scene may be somewhat stringent, e.g., provide an average data rate of up to about 6 Mbps, HD video, and a maximum communication delay between UEs of less than about 200 ms. A hazmat incident scene may involve one or more different types of communications such as URLLC and IoT (and/or narrowband IoT). At the hazmat incident scene, PTT talk and PTT text communications may be used for the common phone book. The UEs at the hazmat incident scene may also use access to cloud databases and a command center. The network slice(s) may provide support for various hazmat sensors, among others, and permit voice calls to limited phone numbers (e.g., hospitals). Performance for the URLLC and IoT communications at the hazmat incident scene may be less stringent than at the terrorist incident scene, e.g., an average data rate of up to about 1 Mbps and a maximum communication delay between UEs of less than about 200 ms. A car accident incident scene may involve other types of communications such as eMBB with PTT talk and PTT video communications used for the common phone book. The network slice(s) may permit voice calls to limited phone numbers (e.g., hospitals). Performance for the eMBB communications at the car accident incident scene may be less stringent than at the terrorist incident scene and in some cases at hazmat incident scene, e.g., an average data rate of up to about 2 Mbps, and adaptive video rate of no less than about 2 Mbps, and a maximum communication delay between UEs of less than about 300 ms.

As described herein, modules and components are tangible entities (e.g., hardware/circuitry) capable of performing specified operations and are configured or arranged in a specific manner to enable the operations to be performed. This arrangement may include an internal arrangement of a particular module or an external arrangement of the module respect to other modules. For example, a server or one or more processors may be configured by firmware or software as a module that operates to perform the operations. Accordingly, the term module, component, and the like is understood to encompass a physically constructed, specifically configured tangible entity that is permanently or temporarily arranged to perform any operation described herein. Where the modules include a general-purpose processor configured using software, the general-purpose processor may be configured as different modules at different times or under different conditions.

Although the processes described herein describe the operations as sequential processes, some of the operations may be performed in parallel and/or may be rearranged. Each process may also have additional steps not included in the figure describing the process. The processes may be implemented in software and/or firmware, the code of which, as above, may be stored in a machine or computer readable medium, such as a non-transitory storage medium and implemented by processing circuitry to perform the desired operations.

Although the terms first, second, etc. may be used herein to describe various elements, these elements should not be limited by these terms. These terms are only used to distinguish one element from another. As used herein, the term "and/or" includes any and all combinations of one or more of the associated listed items. Similarly, as used herein and unless otherwise indicated, "a," "an," and "the" are intended to include one or more of the associated element. The terms "comprising," "including," "having," "containing," and other similar terms, unless otherwise specified, do not preclude the presence or addition of one or more other features, operations, elements, component, or the like.

In the interest of not obscuring the presentation of embodiments in the detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments described herein.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus to manage network resources for communication between agencies involved in an incident,
    an incident manager comprising processing circuitry and a memory configured to:
    receive an indication of an emergency or public safety incident of an incident scene to which responders are to be dispatched;
    determine attributes of a plurality of user equipments (UEs) to be dispatched to the incident scene, the UEs associated with a plurality of agencies, the attributes of the UEs determined dependent on a type of the emergency or public safety incident;
    negotiate with agency consoles of the agencies, capabilities and network resources to be used by the UEs for the determined type of emergency or public safety incident; and
    control, via communication with a network slice orchestrator, a lifecycle of a network slice to provide communication service among the agencies for the emergency or public safety incident, the lifecycle including instantiation, modification, and termination of the network slice, the lifecycle controlled based on communication from each UE to the incident manager indicating arrival to and departure from the incident scene in addition to the attributes of the UE, wherein:
    the responders are first responders and the agencies are first responder agencies; and
    the processing circuitry is configured to control the network slice orchestrator to terminate the network slice only after reception of a leave incident request from a last UE of UEs associated with a highest ranked first responder of each first responder agency.

2. The apparatus of claim 1, wherein
    the processing circuitry is further configured to:
    select, in response to reception of the indication, an incident code to identify the emergency or public safety incident; and
    for each of the agency consoles: generate, for transmission to the agency console, an indication report including the incident code, the type of the incident, and desired attributes of the UEs associated with the agency console for negotiation with the agency console.

3. The apparatus of claim 2, wherein the processing circuitry is further configured to obtain, from the agency consoles, unique user identities (IDs) of, and roles of the first responders associated with the UEs to be dispatched prior to generation of a network slice request to the network slice orchestrator to instantiate the network slice.

4. An apparatus to manage network resources for communication between agencies involved in an incident,
    an incident manager comprising processing circuitry and a memory configured to:
    receive an indication of an emergency or public safety incident of an incident scene to which responders are to be dispatched;
    determine attributes of a plurality of user equipments (UEs) to be dispatched to the incident scene, the UEs associated with a plurality of agencies, the attributes of the UEs determined dependent on a type of the emergency or public safety incident;
    negotiate with agency consoles of the agencies, capabilities and network resources to be used by the UEs for the determined type of emergency or public safety incident and control, via communication with a network slice orchestrator, a lifecycle of a network slice to provide communication service among the agencies for the emergency or public safety incident, the lifecycle including instantiation, modification, and termination of the network slice, the lifecycle controlled based on communication from each UE to the incident manager indicating arrival to and departure from the incident scene in addition to the attributes of the UE;
    wherein the responders are first responders and the agencies are first responder agencies, and
    the processing circuitry is further configured to:
    select, in response to reception of the indication, an incident code to identify the emergency or public safety incident; and for each of the agency consoles: generate, for transmission to the agency console, an indication report including the incident code, the type of the incident, and desired attributes of the UEs associated with the agency console for negotiation with the agency console; and wherein the processing circuitry is further configured to, after negotiation with the agency consoles:
determine network resources and capabilities of the network slice based on attributes of fixed UEs at the incident scene, the attributes of the fixed UEs comprising capabilities of, and network resources to be used by, the fixed UEs;
generate a network slice request for transmission to the network slice orchestrator, the network slice request configured to request the instantiation of the network slice; and
generate an allocation indication for transmission to each of the agency consoles, the allocation indication including the incident code and a slice identity (ID) of the network slice, the slice identity ID received from the network slice orchestrator after the instantiation of the network slice request.

5. The apparatus of claim 4, wherein the processing circuitry is further configured to determine the network resources and capabilities of the network slice further based on default network resources and capabilities associated with the incident type.

6. An apparatus to manage network resources for communication between agencies involved in an incident,
an incident manager comprising processing circuitry and a memory configured to:
receive an indication of an emergency or public safety incident of an incident scene to which responders are to be dispatched;
determine attributes of a plurality of user equipments (UEs) to be dispatched to the incident scene, the UEs associated with a plurality of agencies, the attributes of the UEs determined dependent on a type of the emergency or public safety incident;
negotiate with agency consoles of the agencies, capabilities and network resources to be used by the UEs for the determined type of emergency or public safety incident; and
control, via communication with a network slice orchestrator, a lifecycle of a network slice to provide communication service among the agencies for the emergency or public safety incident, the lifecycle including instantiation, modification, and termination of the network slice, the lifecycle controlled based on communication from each UE to the incident manager indicating arrival to and departure from the incident scene in addition to the attributes of the UE;

wherein the processing circuitry is further configured to:
determine, based on a join incident request received from a joining UE at the incident scene, whether to adjust the service established by the network slice orchestrator, the join incident request including an incident code to identify the incident and capabilities of the joining UE; and
in response to a determination that the service is to be adjusted based on the join incident request:
control the network slice orchestrator to adjust the service, adjustment of the service comprising at least one selected from: instantiation of a new network slice and adjustment of a first current set of capabilities of the network slice, and
receive confirmation from the network slice orchestrator that the service has been adjusted.

7. The apparatus of claim 6, wherein the processing circuitry is configured to generate, for transmission to the network slice orchestrator to control the network slice orchestrator to adjust the service, an adjustment request that comprises the capabilities of the joining UE and at least one of a slice identity ID of the network slice or a new slice ID of the new network slice.

8. The apparatus of claim 6, wherein the processing circuitry is further configured to generate, for transmission to the joining UE:
a join incident response to the join incident request, the join incident response generated independent of the determination of whether the service is to be adjusted based on the join incident request and containing a slice identity (ID) of the network slice to which the joining UE is to establish a (Packet Data Unit) PDU session or attach, and
information to reconfigure the joining UE to install a common application and a common phonebook for communication with other of the UEs that have joined the incident.

9. The apparatus of claim 8, wherein the processing circuitry is further configured to:
determine, based on a leave incident request received from a leaving UE at the incident scene, whether to adjust the service, the leave incident request including the incident code; and
in response to a determination that the service is to be adjusted based on the leave incident request:
control the network slice orchestrator to adjust the service, adjustment of the service comprising at least one selected from: termination of at least one of a plurality of network slices instantiated to provide the service and adjustment of a second current set of capabilities of the network slice, and
receive confirmation from the network slice orchestrator that the service has been adjusted based on the leave incident request.

10. The apparatus of claim 9, wherein the processing circuitry is further configured to generate, for transmission to the leaving UE, a leave incident response to the leave incident request, the leave incident response generated independent of the determination of whether the service is to be adjusted based on the leave incident request and containing the slice ID of the network slice from which the leaving UE is to terminate the PDU session or detach, the leave incident response comprising the incident code and configured to reconfigure the leaving UE to uninstall the common application and the common phonebook.

11. The apparatus of claim 10, wherein at least one of:
the join incident request is communicated via a join push-to-talk (PTT) number dedicated to joining the incident, or
the leave incident request is communicated via a leave PTT number dedicated to leaving the incident.

12. The apparatus of claim 6, wherein the processing circuitry is further configured to generate an affiliation request to the network slice orchestrator to affiliate the joining UE with a particular group at the incident scene.

13. The apparatus of claim 6, wherein the join incident request is communicated via a join incident command that includes the incident code.

14. An apparatus to manage network resources for communication between agencies involved in an incident, an incident manager comprising processing circuitry and a memory configured to:

receive an indication of an emergency or public safety incident of an incident scene to which responders are to be dispatched;

determine attributes of a plurality of user equipments (UEs) to be dispatched to the incident scene, the UEs associated with a plurality of agencies, the attributes of the UEs determined dependent on a type of the emergency or public safety incident;

negotiate with agency consoles of the agencies, capabilities and network resources to be used by the UEs for the determined type of emergency or public safety incident and control, via communication with a network slice orchestrator, a lifecycle of a network slice to provide communication service among the agencies for the emergency or public safety incident, the lifecycle including instantiation, modification, and termination of the network slice, the lifecycle controlled based on communication from each UE to the incident manager indicating arrival to and departure from the incident scene in addition to the attributes of the UE;

wherein the processing circuitry is further configured to:

determine network resources and capabilities of a plurality of network slices to be instantiated by the network slice orchestrator based on the attributes of the UEs and fixed UEs at the incident scene;

control the network slice orchestrator network slices to instantiate the network slices via transmission of a network slice request;

determine, in response to a request from one of the UEs to join the incident, one of the network slices to which the UE is to establish a (Packet Data Unit) PDU session or attach; and generate, for transmission to the one of the UEs in response to the request, information to reconfigure the one of the UEs to install a common application and a common phonebook for communication with others of the UEs that have established the PDU session or are attached to the one of the network slices, the common application and phonebook dependent on the network slice to which the one of the UEs is to establish the PDU session or attach, each common application dependent on capabilities of UEs to establish the PDU session or attach to the network slice associated with the network slice.

* * * * *